(12) United States Patent
Alregib et al.

(10) Patent No.: US 9,094,660 B2
(45) Date of Patent: Jul. 28, 2015

(54) HIERARCHICAL HOLE-FILLING FOR DEPTH-BASED VIEW SYNTHESIS IN FTV AND 3D VIDEO

(75) Inventors: Ghassan Alregib, Atlanta, GA (US); Mashhour Solh, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 758 days.

(21) Appl. No.: 13/294,533

(22) Filed: Nov. 11, 2011

(65) Prior Publication Data

US 2012/0120192 A1    May 17, 2012

Related U.S. Application Data

(60) Provisional application No. 61/412,512, filed on Nov. 11, 2010.

(51) Int. Cl.
*H04N 15/00* (2006.01)
*G09G 5/00* (2006.01)
*H04N 13/00* (2006.01)
*G06K 9/36* (2006.01)
*G06T 5/00* (2006.01)

(52) U.S. Cl.
CPC .............. *H04N 13/0022* (2013.01); *G06T 5/00* (2013.01); *H04N 13/0007* (2013.01); *H04N 13/0029* (2013.01)

(58) Field of Classification Search
USPC .................................................. 348/41–161
See application file for complete search history.

(56) References Cited

U.S. PATENT DOCUMENTS

| | | | |
|---|---|---|---|
| 6,469,710 B1* | 10/2002 | Shum et al. .................... 345/619 |
| 6,838,672 B2* | 1/2005 | Wagenaar et al. ........ 250/363.04 |
| 7,190,518 B1* | 3/2007 | Kleinberger et al. ......... 359/465 |
| 7,260,274 B2* | 8/2007 | Sawhney et al. .............. 382/284 |
| 7,616,885 B2* | 11/2009 | Chen et al. ..................... 396/324 |
| 8,351,685 B2* | 1/2013 | Ho et al. ........................ 382/154 |
| 8,567,953 B2* | 10/2013 | O'Dor et al. ...................... 353/7 |
| 8,655,055 B2* | 2/2014 | Appia ........................... 382/154 |
| 8,670,630 B1* | 3/2014 | Kwatra .......................... 382/254 |
| 2005/0088515 A1* | 4/2005 | Geng ............................... 348/47 |
| 2008/0204546 A1* | 8/2008 | Dawe et al. ..................... 348/51 |
| 2008/0309884 A1* | 12/2008 | O'Dor et al. ...................... 353/7 |

(Continued)

OTHER PUBLICATIONS

"Panoramic Image Mosaic" by Verma and Ju; date retrieved Sep. 3, 2014; http://pages.cs.wisc.edu/~csverma/CS766_09/ImageMosaic/imagemosaic.htmll.*

*Primary Examiner* — Joseph Ustaris
*Assistant Examiner* — Talha Nawaz
(74) *Attorney, Agent, or Firm* — Troutman Sanders LLP; Ryan A. Schneider; Benjamin C. Wiles

(57) ABSTRACT

Methods for hierarchical hole-filling and depth adaptive hierarchical hole-filling and error correcting in 2D images, 3D images, and 3D wrapped images are provided. Hierarchical hole-filling can comprise reducing an image that contains holes, expanding the reduced image, and filling the holes in the image with data obtained from the expanded image. Depth adaptive hierarchical hole-filling can comprise preprocessing the depth map of a 3D wrapped image that contains holes, reducing the preprocessed image, expanding the reduced image, and filling the holes in the 3D wrapped image with data obtained from the expanded image. These methods are can efficiently reduce errors in images and produce 3D images from a 2D images and/or depth map information.

10 Claims, 31 Drawing Sheets

(56) References Cited

U.S. PATENT DOCUMENTS

| | | | |
|---|---|---|---|
| 2011/0001792 A1* | 1/2011 | Pandit et al. | 348/43 |
| 2011/0261050 A1* | 10/2011 | Smolic et al. | 345/419 |
| 2012/0056879 A1* | 3/2012 | Song et al. | 345/419 |
| 2012/0262542 A1* | 10/2012 | Veera et al. | 348/42 |
| 2013/0011046 A1* | 1/2013 | Choi et al. | 382/154 |
| 2013/0162773 A1* | 6/2013 | Tian et al. | 348/43 |
| 2013/0162774 A1* | 6/2013 | Tian et al. | 348/43 |
| 2014/0055449 A1* | 2/2014 | O'Dor et al. | 345/419 |

* cited by examiner

HIERARCHICAL HOLE-FILLING FOR DEPTH-BASED VIEW SYNTHESIS IN FTV AND 3D VIDEO

CROSS-REFERENCE TO RELATED APPLICATION

This Application claims benefit under 35 USC §119(e) of U.S. Provisional Patent Application Ser. No. 61/412,512 filed 11 Nov. 2010, which is incorporated herein by reference as if fully set forth below in its entirety.

BACKGROUND OF THE INVENTION

Embodiments of the present invention relate generally to three-dimensional images, and more specifically to improved three-dimensional image synthesizing using depth image-based rendering (DIBR) and hierarchical hole-filling.

An increasing number of movies and TV programs are being produced and/or presented in stereoscopic 3D format. This trend is being driven, at least in part, by noticeable advances in stereoscopic display technologies. Three dimensional television (3DTV) and 3D mobile TV are widely considered to be the future of multimedia broadcasting. 3DTV and other technologies can bring a more life-like and visually immersive experience to viewers.

In the future, viewers may have, for example, the freedom to navigate through a scene and choose multiple viewpoints. This is known as free-viewpoint TV (FTV). This technology can also be desirable and applicable to, for example and not limitation, movie theaters, presentations, still pictures, computer generated images (CGI), and animation, where viewers view 3D printed or projected image or motion picture.

Producing an FTV image can be complex. To produce stereoscopic 3D videos, for example, each individual viewpoint requires two videos corresponding to the left and right camera views. In addition, true multi-viewpoint video, such as true FTV, for example, can require up to 32 viewpoints (or possibly more). Consequently, capturing and broadcasting arbitrary viewpoints for FTV can require an unrealistically high number of cameras, extremely complex coding, and expensive processors. In addition, advances in 3D display technologies, such as autostereoscopic displays, require flexibility in the number of views and/or the ability to resize each view to match the display resolution. Hence, generating FTV from the multi-camera capture of a large number of views can be cumbersome and expensive.

One alternative is to generate, or synthesize, the intermediate views using view synthesis. One method of view synthesis is the aforementioned DIBR. In DIBR, two or more views for 3D display can be generated from a single 2D image and a corresponding depth map (i.e., an image or image data that contains information relating to the distance of the surfaces in a scene from a particular viewpoint).

DIBR has several advantages including, but not limited to, high bandwidth-efficiency, interactivity, easy 2D to 3D switching, and high computational and cost efficiency. These advantages make it possible for a TV, or other multimedia display device, to receive a 2D image and a depth map, and to convert the 2D image and depth map into a 3D image. In addition, through DIBR, a TV or other multimedia display device can receive a series of 2D images and depth maps, and convert the 2D images and depth maps into 3D images, which can be shown in succession to form 3D video.

In addition, DIBR can be accomplished using one or two cameras (less than would be required if each viewpoint was captured by its own camera or set of cameras). DIBR also eliminates photometric asymmetries between the left and right views because both views are generated from and based on the same original image. The inherent advantages of DIBR have lead the Motion Pictures Expert Group ("MPEG") to include it in their standard for coding video plus depth format, which is known as MPEG-C part 3. As shown in FIG. 1, the process of producing 3D images from captured content (with a 3DTV system, for example) can comprise six main steps: 3D video capturing and depth content generation 101; 3D content video coding 102; transmission 103; decoding the received sequences 104; generating virtual views 105; and displaying the stereoscopic images on the screen 106.

With DIBR, virtual views can be generated from the reference image and the corresponding depth map using a process known as 3D wrapping. The 3D wrapping technique allows mapping of a pixel at a reference view to a corresponding pixel at a virtual view at a desired location. This can be accomplished by first projecting the pixels at the reference view into world coordinates using explicit geometric information from the depth map and camera parameters. The pixels in the world coordinates can then be projected into the estimated virtual image coordinates to yield a 3D wrapped image.

To better understand DIBR, consider a reference camera $C_r$ and a virtual camera $C_v$, as shown in FIG. 2. Further consider that $F_r$ and $F_v$ are the focal lengths of the reference and the virtual cameras, respectively (for simplicity, $F_r$ and $F_v$ are assumed to be equal, but do not have to be). Additionally, B is the baseline distance that separates the two cameras, and $Z_c$ is the convergence distance of the two cameras axis. The horizontal coordinates vector $X_v$ of the virtual camera as a function of the horizontal coordinate vector $X_r$ of the reference camera is given by:

$$\overline{X}_v = \overline{X}_r + s\frac{F_v B}{\overline{Z}} + h$$

where $s=-1$ when the estimated view is to the left of the reference view and $s=+1$ when the estimated view is to the right of the reference view, Z is a vector of the depth values at pixel location $(x_r, y_r)$, and h is the horizontal shift in the camera axis which can be estimated as:

$$h = -s\frac{F_v B}{Z_c}.$$

In some applications the depth value is presented in terms of disparity maps. In such cases, the depth vector Z at a certain pixel location can be obtained from disparity vector D as:

$$\overline{Z} = \frac{F_r b}{\overline{D}}$$

where b is the original baseline distance of the stereo camera pair used in the disparity calculation. Finally, the wrapping equation can be expressed in terms of disparity as:

$$x_v = x_r + s\frac{F_c B \overline{D}}{F_r b} - s\frac{F_v B}{Z_c}$$

3D wrapping does not always result in a perfect image. Synthesized views using 3D wrapping may contain holes for a variety of reasons. Often, the holes are caused by disocclusion, which is primarily caused by two factors. Disocclusion can be caused, for example, by uniform sampling in the reference image becoming non-uniform in the desired image due to the virtual viewing angle. In other cases, holes can be caused simply because formerly occluded areas in the reference image becoming visible in the virtual image. In other words, as the image is manipulated, features come into, and go out of, view. Holes can also be the result of, for example and not limitation, inaccurate depth maps, errors in transmission, or noise in the depth map or image signal. FIGS. 3a-3c show several examples of synthesized images immediately after 3D wrapping. The holes in these figures tend to appear as black areas and/or black lines.

The presence of holes as the result of DIBR is a challenging problem because there is little or no information that can be derived from the depth map or the reference camera about disoccluded areas. One method that has been used to attempt to cure this problem is Gaussian filtering of the depth map, which is generally exemplified in FIG. 4. In this method, a Gaussian filter smoothes sharp transitions in the depth map thereby reducing the size of holes in the 3D wrapped image. The smaller holes can then be filled using an average filter. A problem with this approach is that processing the depth map through smoothing results in geometric distortions, as can be seen in the imperfections in FIGS. 5a and 5b.

To remedy these distortions; Zhang et al. proposed using a symmetric Gaussian filter followed by an average filtering of the image. L. Zhang & W. J. Tam, *Stereoscopic Image Generation Based On Depth Images For 3DTV*, IEEE TRANS. ON BROADCASTING, vol. 51, no. 2, pp. 191-199 (June 2005). One drawback of this approach is that it changes the original depth values resulting in a loss of depth cues after wrapping. This loss tends to lead to image distortion.

Criminisi et al. developed an inpainting technique for hole-filling in DIBR. A. Criminisi et al., *Object Removal by Exemplar-Based Inpainting*, IEEE TRANSACTIONS ON IMAGE PROCESSING, p. 13 (2004). Criminisi's method fills the holes by using a texture synthesis algorithm that gives higher weights to linear structures in an attempt to reduce image distortion. Unfortunately, the subjective results from Criminisi's technique have shown only a very slight improvement over the quality obtained by other methods and the resulting videos tend to suffer from severe flicker as a result of temporal inconsistencies.

Vazquez et al. developed a technique of horizontal interpolation to reduce holes. C. Vazquez et al., *Stereoscopic Imaging: Filling Disoccluded Areas in Depth Image-Based Rendering*, Society of Photo-Optical Instrumentation Engineers (SPIE) Conference Series, vol. 6392 (October 2006). However, this method tends to cause severe and undesirable distortion to the texture of the background.

Thus, there is a need to produce high quality 3D images in a manner that is computationally efficient and requires reduced bandwidth. There is also a need for a method of removing holes from a view synthesized by DIBR that does not distort the image, does not lead to flickering, and results in a high quality image. There is also a need for a method of removing holes from a view synthesized by DIBR when the image is distorted or corrupted due transmission errors and/or distorted or corrupted signals. It is to these issues that embodiments of the present invention are primarily directed.

BRIEF SUMMARY OF THE INVENTION

Embodiments of the present invention comprise at least two new approaches for error and disocclusion removal in depth image-based rendering ("DIBR"). These approaches can include hierarchical hole-filling ("HHF") and depth adaptive hierarchical hole-filling ("depth adaptive HHF") and can eliminate the need for additional smoothing or filtering of a depth map. In some embodiments, these techniques can use a pyramid-like approach to generate lower-resolution estimates of the 3D wrapped image, and then can assign colors to the holes from that lower-resolution image. The lower-resolution estimates can be made from, for example, a pseudo zero-canceling plus Gaussian filtering of the wrapped image.

In some embodiments, depth adaptive HHF can incorporate depth information from the depth map to produce a higher resolution rendering around previously occluded areas. HHF and depth adaptive HHF can yield virtual images and stereoscopic videos that are virtually free of geometric distortions and can provide better rendering quality both subjectively and objectively than traditional hole-filling approaches. These methods can also eliminate the noise resulting from 'bad" pixels in the depth map, and can eliminate holes formed by transmission errors and/or distorted or corrupted signals.

In some embodiments of the HHF approach, lower-resolution estimates of a 3D wrapped image can be produced by a pseudo Gaussian plus zero-canceling filter. This operation can be referred to as a Reduce operation and, in some embodiments, can be repeated until there are no longer holes remaining in the image. In some embodiments, the lowest resolution image can then be expanded in an Expand operation. The expanded pixels can then be averaged and used to fill the holes in the second most reduced image. The second most reduce image can then be expanded. This process can be repeated until significantly all holes in the 3D wrapped image are filled. In some embodiments, the process can be repeated until the size of the holes, the number of holes, or both reach a predetermined threshold (e.g., the size or quantity at which they are no longer visible).

In some embodiments, depth adaptive HHF can be used to reduce blur and improve image quality. Depth adaptive HHF can comprise, for example, preprocessing a 3D wrapped image to give greater weight to the background in the image than the foreground in the image. This step can help eliminate blur caused when the background and the foreground are simply averaged together in the Gaussian and zero elimination filtering operation. After the 3D wrapped image is pre-processed to increase the weight of the background, the HHF process can be applied to the preprocessed image and the pixels from the resulting image are then used to fill holes in the 3D wrapped image.

These and other objects, features and advantages of the present invention will become more apparent upon reading the following specification in conjunction with the accompanying drawing figures.

DETAILED DESCRIPTION OF PREFERRED EMBODIMENTS

Figure 1:
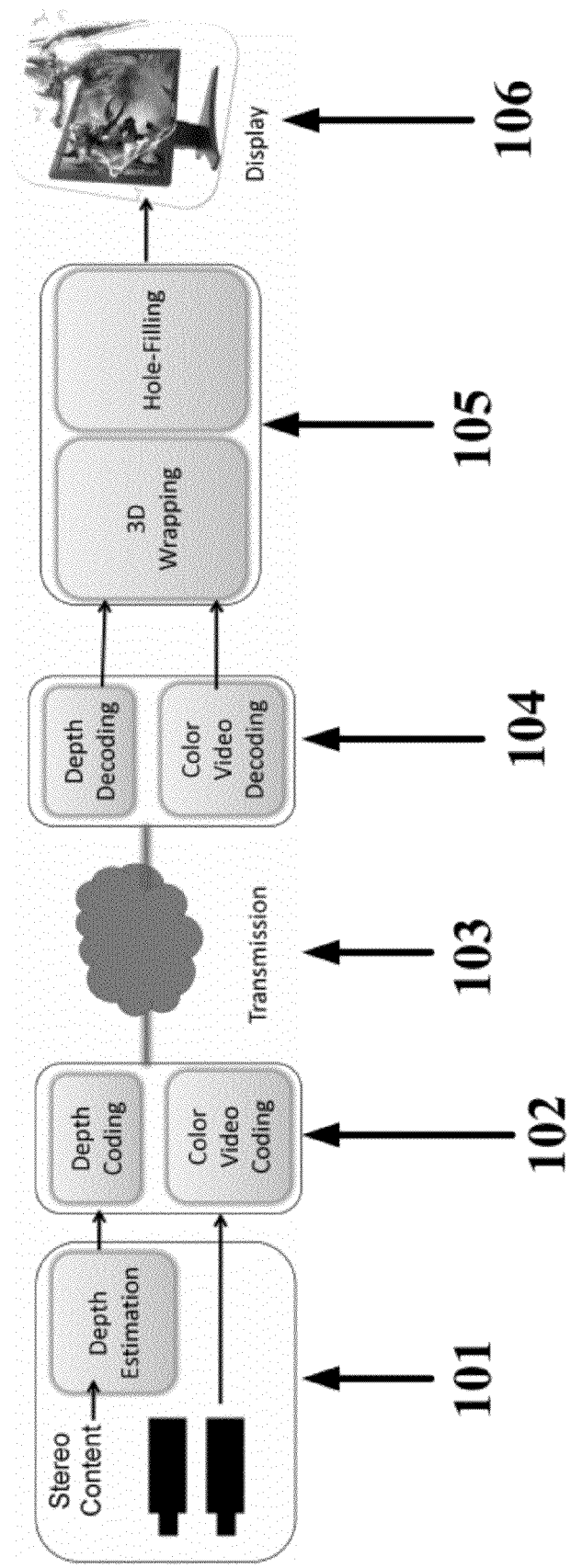
FIG. 1 depicts a method of producing 3D images from captured content, in accordance with some embodiments of the present invention.
Figure 2:
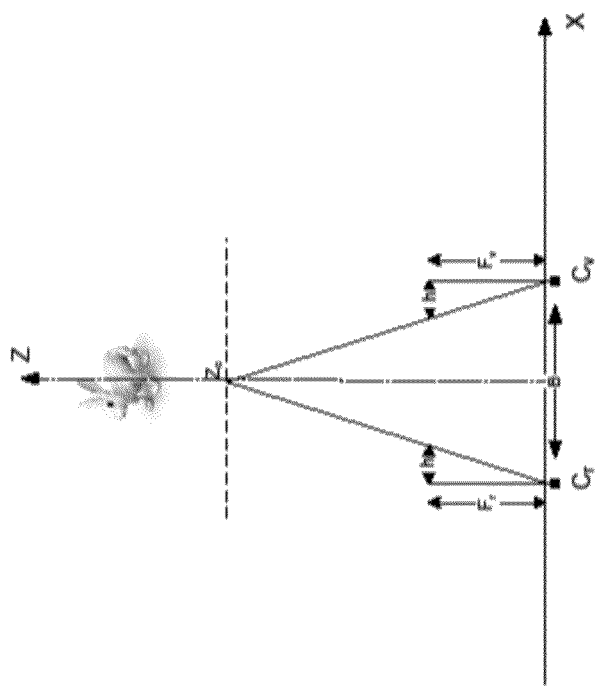
FIG. 2 depicts an image-capture scenario for depth image-based rendering (DIBR), in accordance with some embodiments of the present invention.
Figure 3A:
FIGS. 3a-3c depict examples of synthesized images after 3D wrapping, in accordance with some embodiments of the present invention.
Figure 3B:
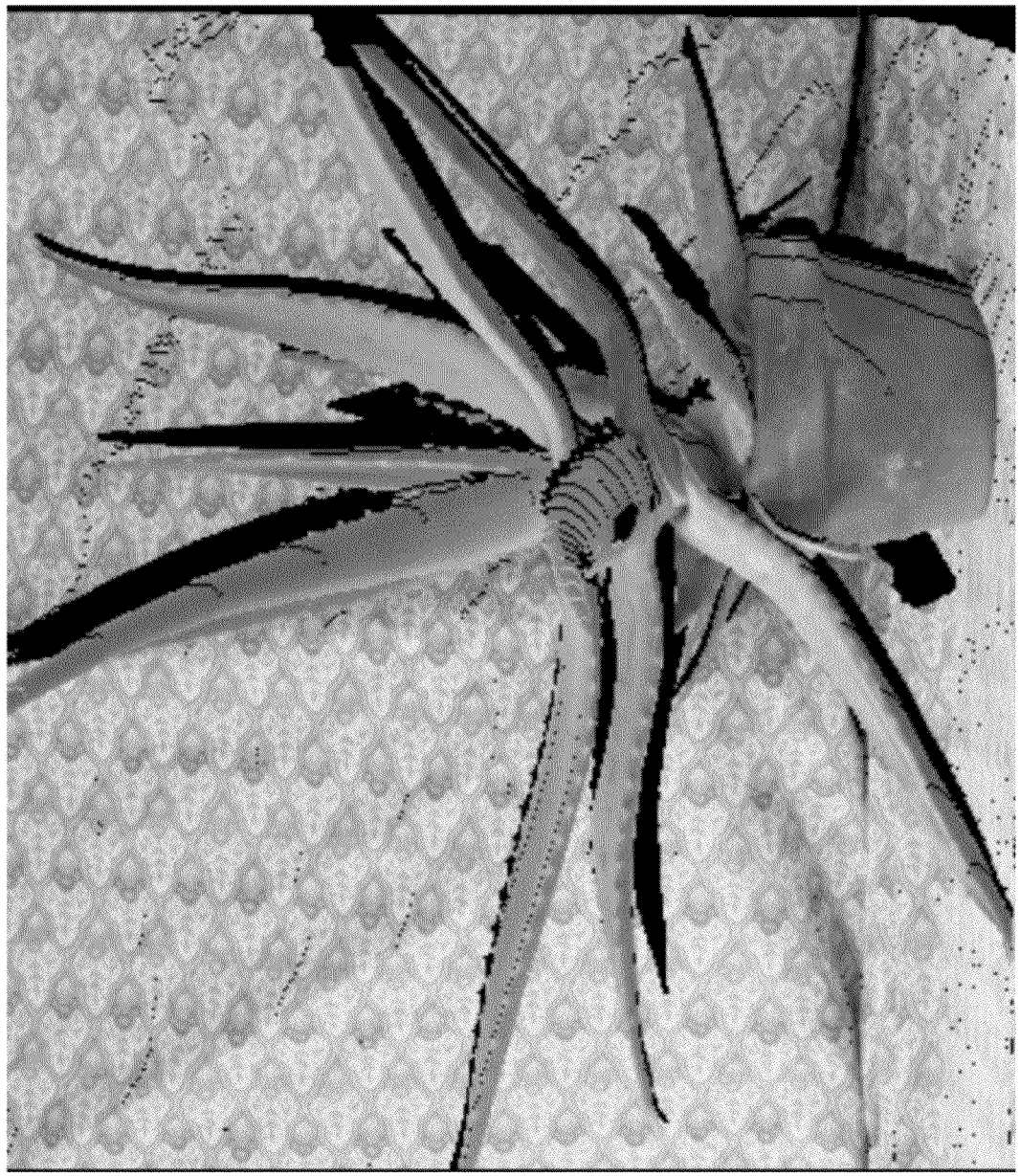
Figure 3C:
Figure 4:
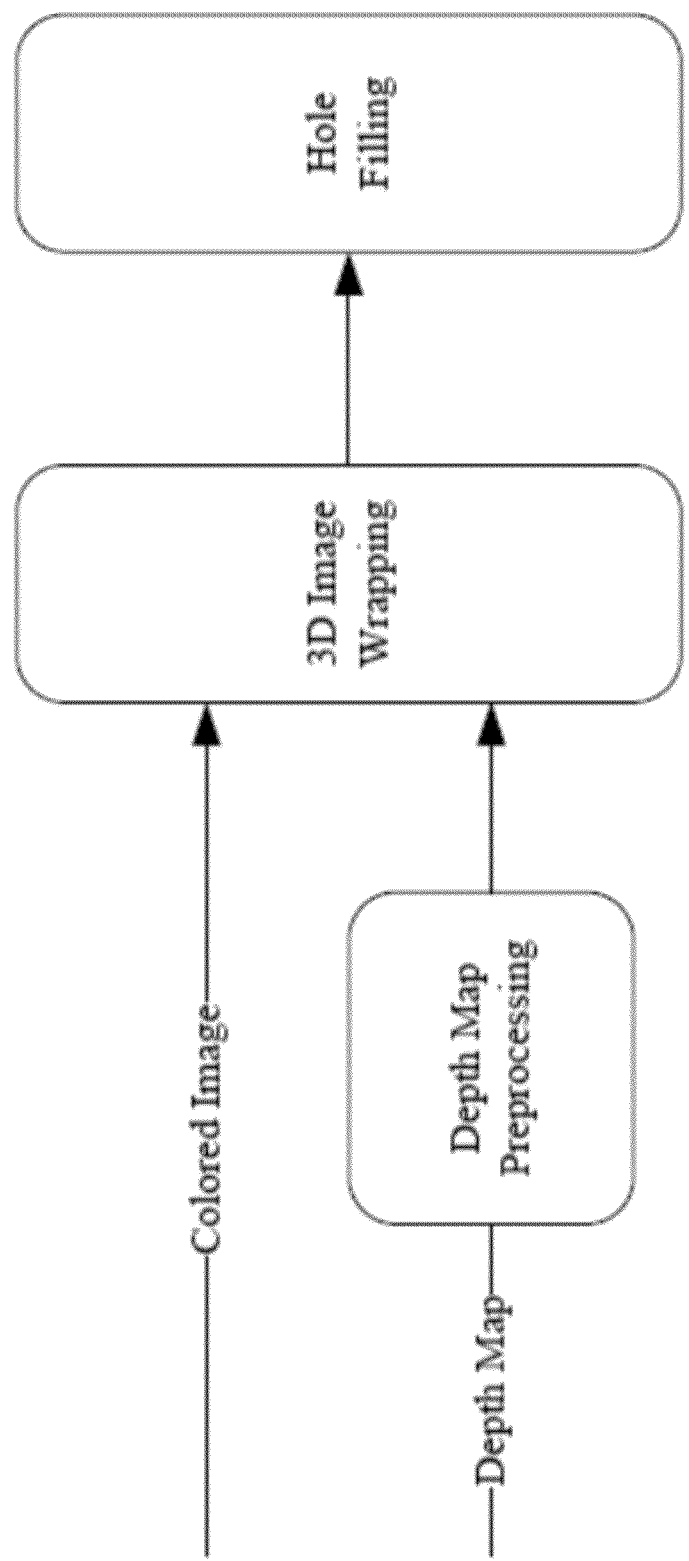
FIG. 4 depicts a method of filling holes in 3D wrapped images utilizing Gaussian filtering (preprocessing) of the depth map.
Figure 5A:
FIGS. 5a-5b depict 3D wrapped images that have undergone hole-filling by a method utilizing Gaussian filtering (preprocessing) of the depth map.
Figure 5B:

Embodiments of the present invention relate to improved methods for depth image based rendering ("DIBR") to produce one or more 3D images from conventional 2D image data. Embodiments of the present invention can comprise hierarchical hole filling ("HHF") to reduce errors and omissions in intermediate image views that have been synthesized from single view, 2D images. In other embodiments, the method can comprise depth adaptive HHF, which can incorporate depth map information to produce high quality intermediate views with improved clarity.

Although preferred embodiments of the invention are explained in detail, it is to be understood that other embodiments are contemplated. Accordingly, it is not intended that the invention is limited in its scope to the details of construction and arrangement of components or methods set forth in the following description or illustrated in the drawings. The invention is capable of other embodiments and of being practiced or carried out in various ways. Also, in describing the preferred embodiments, specific terminology will be resorted to for the sake of clarity.

For the sake of clarity and ease of explanation, exemplary embodiments are described below in connection with the transmission, processing, and display of 3-dimensional television ("3DTV"). Those skilled in the art will recognize, however, that embodiments of the present invention are not so limited and could be used, for example and not limitation, for 3D gaming, 3D movies, and 3D electronic displays. In addition, applications such as mobile phones, computers, and tablets are also possible and contemplated herein. Embodiments of the present invention can also be used to effectively reduce or eliminate holes and errors in images caused by errors in transmission, processing, or other sources.

It must also be noted that, as used in the specification, and the appended claims, the singular forms "a," "an" and "the" include plural referents unless the context clearly dictates otherwise. Also, in describing the preferred embodiments, terminology will be resorted to for the sake of clarity. It is intended that each term contemplates its broadest meaning, as understood by those skilled in the art, and includes all technical equivalents, which operate in a similar manner, to accomplish a similar purpose.

Ranges may be expressed herein as from "about" or "approximately" one particular value and/or to "about" or "approximately" another particular value. When such 2 range is expressed, another embodiment includes from the one particular value and/or to the other particular value. By "comprising" or "containing" or "including" is meant that at least the named compound, element, particle, or method step is present in the composition or article or method but, does not exclude the presence of other compounds, materials, particles, method steps, even if the other such compounds, material, particles, method steps have the same function as what is named.

It is also to be understood that the mention of one or more method steps does not preclude the presence of additional method steps, or intervening method steps, between those steps expressly identified. Similarly, it is also to be understood that the mention of one or more components in a device or system does not preclude the presence of additional components or intervening components between those components expressly identified.

As discussed, certain shortcomings exists in conventional methods for synthesizing intermediate views for use in 3D imaging. These shortcomings can include, for example and not limitation, blurring, shadowing, and poor hole filling. In addition, conventional methods can have high bandwidth requirements and high computational costs, among other things. What is needed, therefore, is a more efficient method for generating clear, error free intermediate views for 3D imaging. It is to such a method that embodiments of the present invention are primarily directed.

Embodiments of the present invention can comprise a hierarchical hole-filling (HHF) approach used to eliminate holes in 3D wrapped images. Embodiments of the present invention can further comprise a depth adaptive HHF ("depth adaptive HHF") approach that eliminates holes in a 3D wrapped image and provides reduced blurring and distortion in the image.

Figure 6:
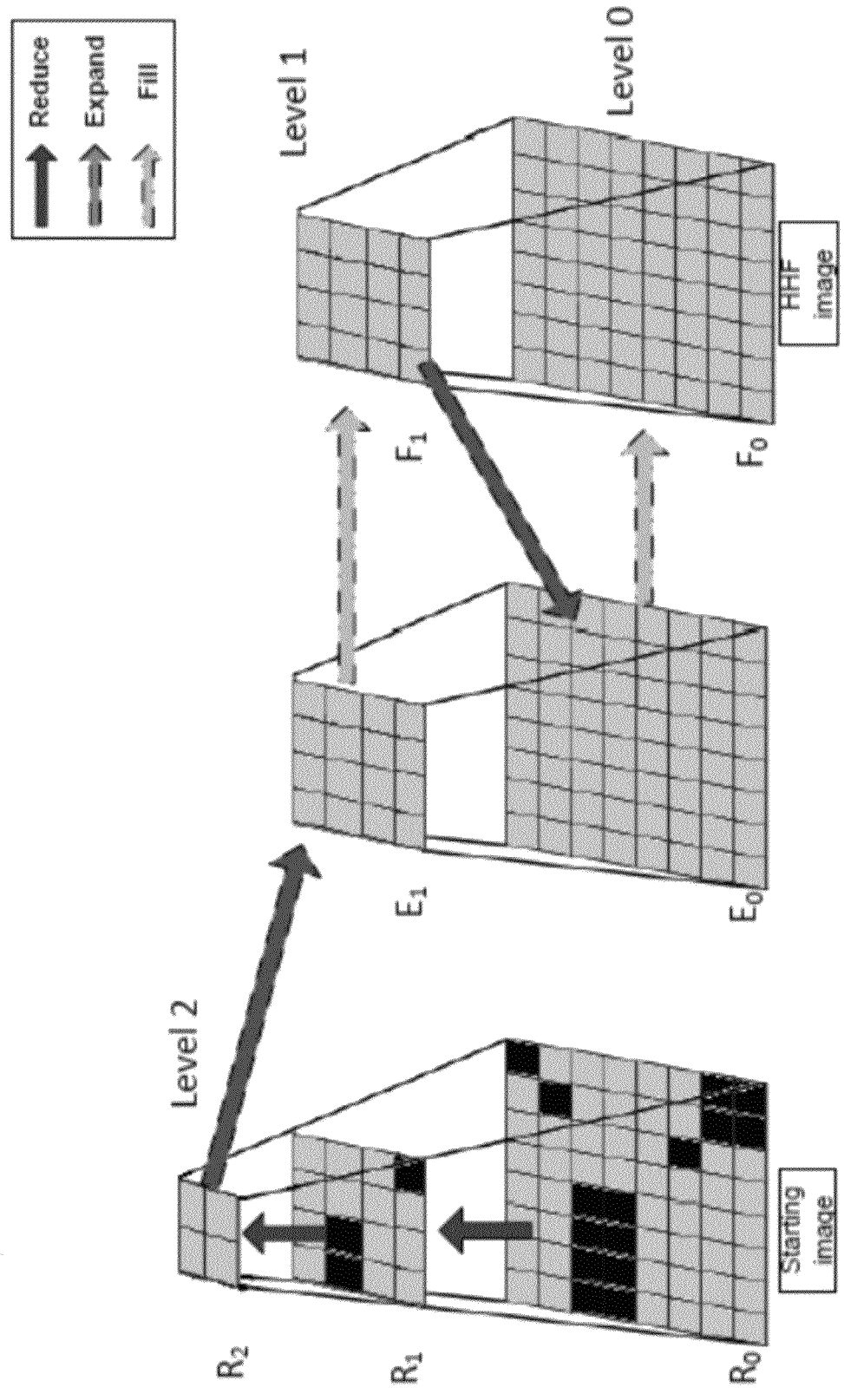
FIG. 6 depicts a graphical view of a method of hierarchical hole-filling (HHF), in accordance with some embodiments of the present invention.

FIG. 6 illustrates an exemplary embodiment of the HHF method. In some embodiments, the HHF method can comprise an algorithm for reducing holes in intermediate views. To begin, lower-resolution estimates of the 3D wrapped image can be produced by one or more smoothing functions. In a preferred embodiment, the smoothing function can be a pseudo Gaussian plus zero-canceling filter. In other embodiments, the holes can be non-zero values that are, for example and not limitation, saturated at the highest luminance value or other forms of non-zero holes. In such cases, the smoothing function can be a pseudo Gaussian plus K-canceling filter, where K is the value assigned for the holes in an image. The smoothing filter can use, for example, non-zero values in an [X×X] block of pixels. Using larger blocks, for example, can reduce the image more quickly, while using smaller blocks can maintain greater image data at the expense of computational efficiency. In a preferred embodiment, [5×5] blocks of pixels are used to produce a lower-resolution image. During this process, while black image data is maintained (generally denoted with a 1), the zeros (holes) in the image do not influence the calculations. Thus, as the image is reduced, the holes are gradually eliminated.

This operation is called a Reduce operation and, in some embodiments, can be repeated until there are no longer holes in the most recent image. In some embodiments, the process can be repeated until the size of the holes, the number of holes, or both reach a predetermined threshold (e.g., the size or quantity at which they are no longer visible). In some embodiments, the image may be reduced until the holes are removed or a predetermined threshold is reached.

The Reduce operation can produce a sequence of low-passed filtered images $R_0, R_1 \ldots R_N$, wherein $R_1$ is a reduced version of $R_0$, and $R_1$ can have lower-resolution, sample density, and number and/or size of holes than $R_0$. Similarly, $R_2$ is a reduced version of $R_1$, and so on until $R_N$, which has been reduced to the point of having no holes in an embodiment of the present invention. The number of reduced images needed to eliminate the holes depends, in part, on the number and size of the holes. In other words, when an area larger than the sample window (e.g., a 5×5 block) contains all holes, for example, an in initial Reduce may not eliminate the holes in that particular area. As a result, the Reduce operation may need to be repeated.

In some embodiments, the image should be reduced until there are no longer visible holes in the image. In practice, N=3 is generally sufficient to reduce or eliminate all holes for high-definition resolution, but this figure can be higher or lower depending on various parameters including, but not limited to, the number of holes, the number of corrupted pixels or depth pixels, changes in resolution, quality of the original image, quality of the generated depth map, and transmission error rates. In addition, higher values of N may be implemented to achieve, for example, higher resolution or higher quality in the final image.

The number of holes that should be removed from the image is highly variable and depends on, for example and not limitation, image size, image content, the amount of depth/disparity, and post processing. In some embodiments, therefore, the image can be reduced until the number of holes, the size of the holes, or the total percentage of holes in the image is reduced to a pre-programmed or user-selected amount. In a preferred embodiment, the number of remaining holes can be between 0% and 5% of the overall image size. Additionally, in some embodiments, the image can be reduced until the holes are reduced to a pre-programmed or user-selected size. For example, an image can be reduced until the holes are reduced in size to the point that they can no longer be detected by the human eye. In some embodiments, an image can be reduced until the holes are reduced in size to no more than 5×5 pixels. Both of these methods enable a manufacturer or a user to regulate how many Reduce operations will be run based on the attributes of an image.

Figure 7:
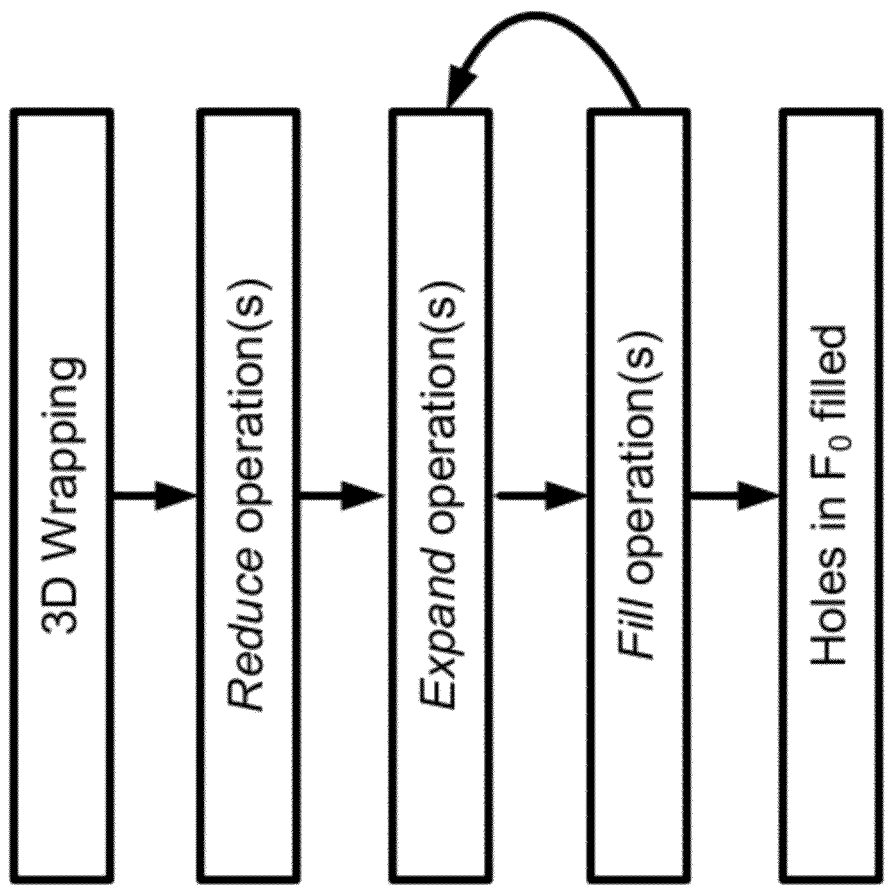
FIG. 7 depicts a flowchart of a method of HHF, in accordance with some embodiments of the present invention.

In some embodiments, the lowest resolution image, $R_N$, can next be expanded in an Expand operation. The Expand operation can produce an interpolated image $E_{N-1}$ of a size equal to that of $R_{N-1}$. In some embodiments, the Expand operation is essentially the reverse of the Reduce operation. During the Expand operation, for example, the holes in $R_{N-1}$ image can be filled by a Fill operation that replaces the holes with the corresponding pixel(s) in $E_{N-1}$. The resulting HHF image can be designated $F_{N-1}$. The Expand and Fill operations can be repeated with $F_{N-1}$, $F_{N-2}$, etc. The HHF process is complete after all, or substantially all, the holes in the $F_0$ image are filled. As discussed above, the number of acceptable holes in the $F_0$ image can be determined by the user and can vary based on the desired final resolution and the quality of original image, among other factors and parameters. A flowchart depicting some embodiments of the HHF process is shown in FIG. 7.

As mentioned above, the Reduce operation can use a sliding [X×X] window pseudo Gaussian filter to produce a lower-resolution image, however, the averaging performed by the filter is only done over the non-zero values in the sliding window. In other words, since holes generally have a zero value in the image data, the holes are not taken into account in the filter. As the filter operates, therefore, each value within image $R_1$ can be computed as a weighted average of the non-zero values in $R_0$ within the [X×X] window.

One exception, however, is when all the values in a particular window are zeros (i.e., holes). In that case, the Reduce operation can result in a zero value; however, this problem can be addressed in successive iterations. Each value within $R_2$ can be obtained from values within $R_1$ by applying the same process, and the process can be further repeated for $R_3$, etc. The process can gradually reduce the number of holes from $R_k$ to $R_{k+1}$ for $0<k<N-1$. In a preferred embodiment, a 5×5 filter can be used, which provides adequate filtering at fairly low computational cost, although, as mentioned, windows larger or smaller than 5×5 are possible.

In the Reduce operation, if $R_0$ is the original image, for example, then $R_1$ and $R_{k+1}$ in general can be computed using the following relation:

$$R_{k+1} = \text{Reduce}(R_k).$$

In this configuration, for each pixel [m, n] in $R_{k+1}$ there can be a 5×5 matrix $A_{m,n}$, which can be defined as:

$$A_{m,n} = \begin{pmatrix} R_k[2m+1, 2n+1], & \ldots & R_k[2m+1, 2n+5] \\ R_k[2m+2, 2n+1], & \ldots & R_k[2m+2, 2n+5] \\ R_k[2m+3, 2n+1], & \ldots & R_k[2m+3, 2n+5] \\ R_k[2m+4, 2n+1], & \ldots & R_k[2m+4, 2n+5] \\ R_k[2m+5, 2n+1], & \ldots & R_k[2m+5, 2n+5] \end{pmatrix}$$

Additionally, $nz(A_{m,n})$ is the number of non-zeros in matrix $A_{m,n}$ and w is the (in this case) 5×5 Gaussian kernel (i.e., a 5×5 Gaussian low pass filter). The filter mask can be designed, for example, such that the center pixel gets more weight than the neighboring pixel. The remaining terms can then be chosen such that their sum is 1. A Gaussian kernel could be, for example and not limitation:

$$w = Wt \times Wt'$$

where $$Wt = [0.0500 \ 0.2500 \ 0.4000 \ 0.2500 \ 0.0500]$$

And Wt' is the transpose of Wt. With these definitions, the Reduce operation can be defined as:

$$R_{k+1}[m, n] = \begin{cases} \sum_{i=1}^{5} \sum_{j=1}^{5} w[i, j] A_{m,n}[i, j], & \text{if } nz(A_{m,n}) = 25 \\ \dfrac{\sum_{i=1}^{5} \sum_{j=1}^{5} A_{m,n}[i, j]}{nz(A)}, & \text{if } nz(A_{m,n}) < 25 \\ 0, & \text{if } nz(A_{m,n}) = 0 \end{cases}$$

In some embodiments, the Expand operation can be a linear interpolation defined for k>0:

$$E_k = \text{Expand}(E_{k+1}).$$

Thus, for a pixel [m, n] the Expand operation can be:

$$E_k[m, n] = 4 \sum_{i=-2}^{2} \sum_{j=-2}^{2} E_{k+1}\left[\frac{2m+i}{2}, \frac{2n+j}{2}\right]$$

where only terms for which $$\frac{2m+i}{2} \text{ and } \frac{2n+j}{2}$$

are integers contribute to the sum.

In some embodiments, the Fill operation can replace the holes in the reduced image with an expanded hole-free version and can be defined for a pair of images $R_k$ and $E_k$ as follows:

$$F_k = \text{Fill}(R_k, E_k).$$

For a pixel [m, n] the Fill operation can be:

$$F_k[m, n] = \begin{cases} E_k[m, n], & \text{if } R_k[m, n] = 0 \\ R_k[m, n], & \text{Otherwise.} \end{cases}$$

Figure 8B:
FIG. 8b depicts the 3D wrapped image of FIG. 8a after applying HHF, in accordance with some embodiments of the present invention.
Figure 8A:
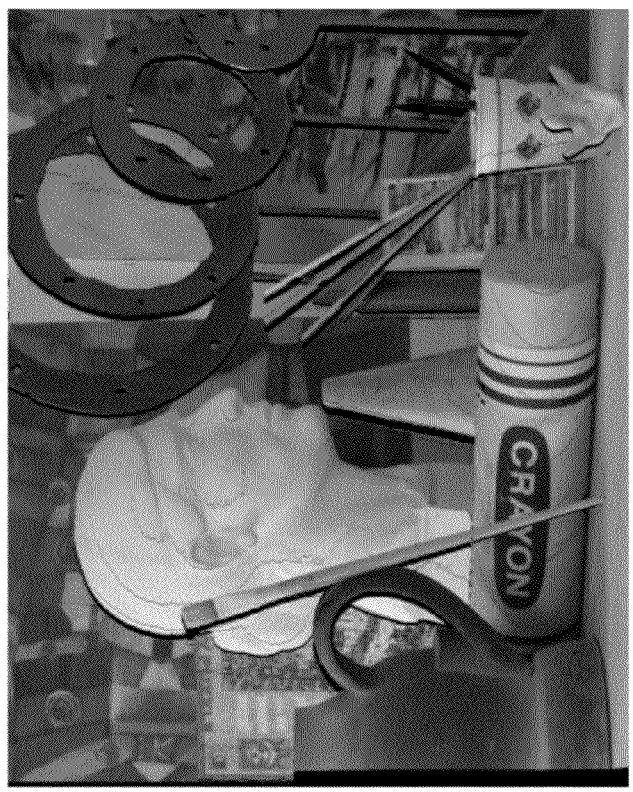
FIG. 8a depicts a 3D wrapped image with no hole-filling applied.
Figure 8D:
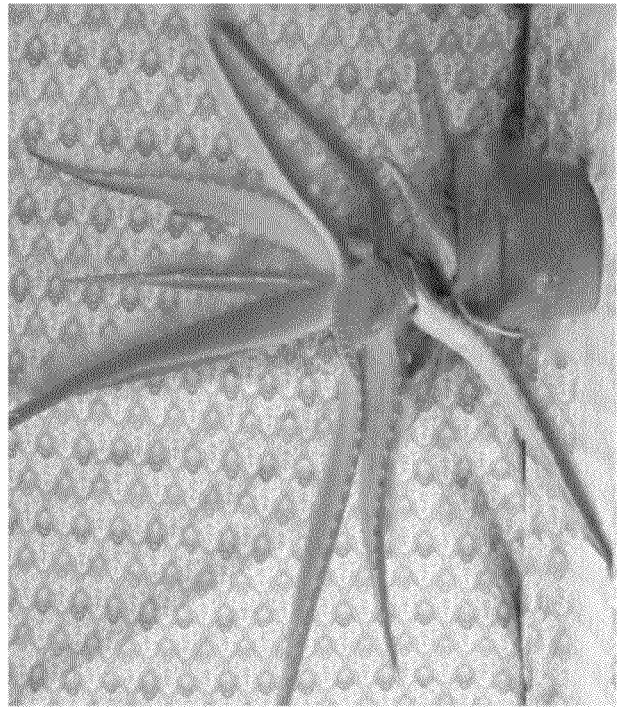
FIG. 8d depicts the 3D wrapped image of FIG. 8c after applying HHF, in accordance with some embodiments of the present invention.
Figure 8C:
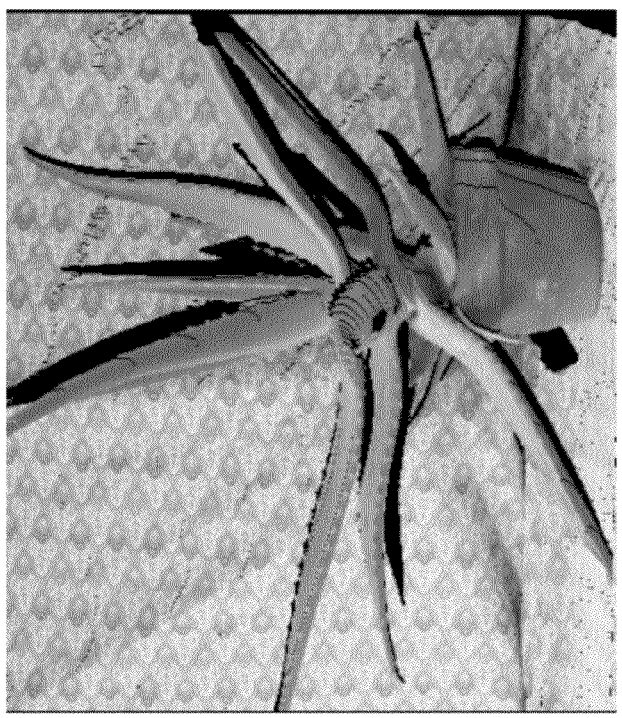
FIG. 8c depicts a 3D wrapped image with no hole-filling applied.
Figure 8F:
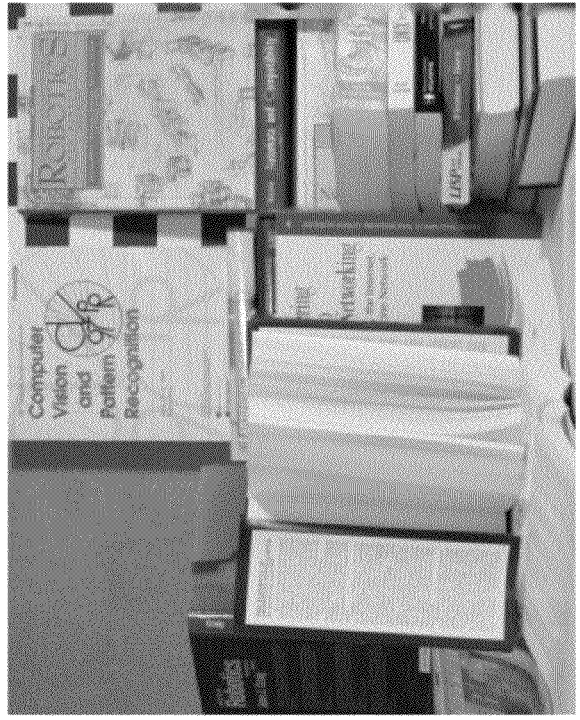
FIG. 8f depicts the 3D wrapped image of FIG. 8e after applying HHF, in accordance with some embodiments of the present invention.
Figure 8E:
FIG. 8e depicts a 3D wrapped image with no hole-filling applied.

FIGS. 8a-f show a set of 3D wrapped virtual images. FIGS. 8a, 8c, and 8e are images after 3D wrapping, and FIGS. 8b, 8d, and 8f are corresponding images after applying HHF in accordance with some embodiments of the present invention. As shown, the disocclusion in the 3D wrapped images can be eliminated as a result of applying HHF. As a result, no further hole-filling is generally required.

Figure 9:
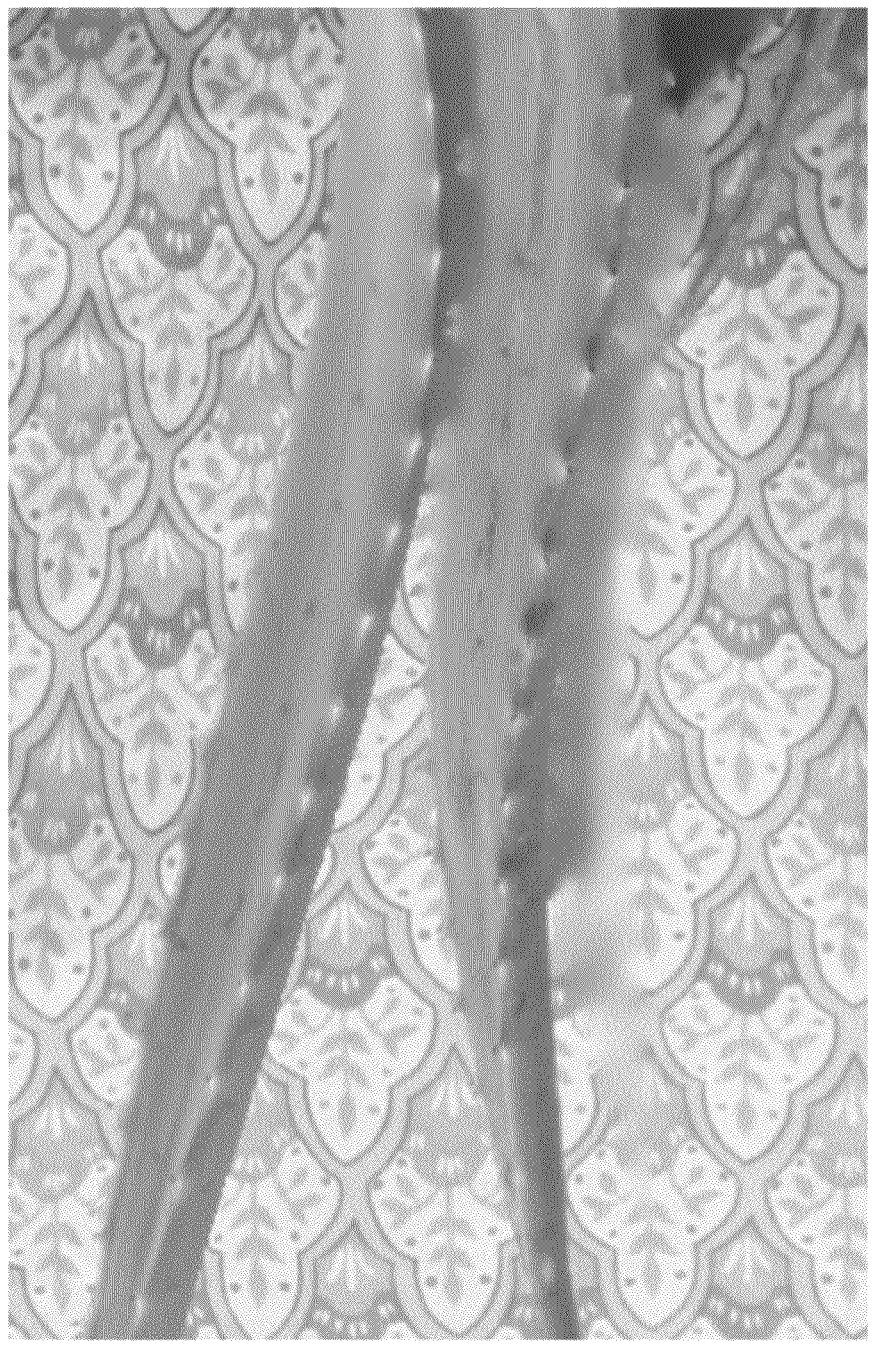
FIG. 9 depicts a 3D wrapped image after applying HHF, in accordance with some embodiments of the present invention.

As shown in FIG. 9, in some instance, HHF may introduce slight blurring around and/or in previously disoccluded areas. Subjective experiments have shown, however, that because one of the images is the original, unmodified image, this slight blur is largely unnoticeable in synthesized stereoscopic videos. In order to avoid possible visual fatigue, however, a depth adaptive HHF approach can be used, which can produce higher resolution hole-filling and can substantially eliminate this blur.

Figure 10:
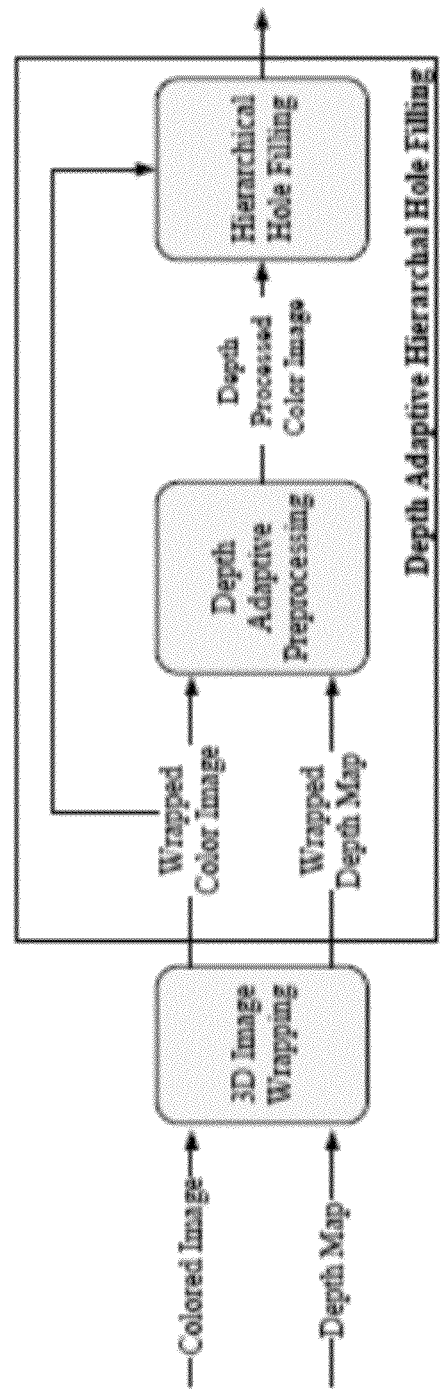
FIG. 10 depicts a flowchart of a method of depth adaptive HHF, in accordance with some embodiments of the present invention.

FIG. 10 is a flowchart representing a depth adaptive HHF approach in accordance with some embodiments of the present invention. In some embodiments, both the colored image and depth map image can undergo 3D wrapping. The wrapped depth map can then be used to generate a depth-weighted color image through depth adaptive preprocessing of the wrapped color image. The resulting depth processed image can then used as the starting point for HHF. The pixels estimated by applying HHF on the processed image can then be used to fill holes in the 3D wrapped image.

In accordance with some embodiments of the present invention, depth adaptive preprocessing can enhance the resolution around depth plane transitions (i.e., the areas most likely to have disocclusions). The areas surrounding the disocclusions are generally not random regions of an image, but tend to be areas of depth plane transition (i.e., where the depth between two surfaces changes). Since disocclusion occurs around the edges of depth transition, these areas tend to be composed of a combination of background and foreground pixels. As a result, the disoccluded areas are more likely to be areas belonging to the background of the image, rather than the foreground.

In some embodiments, foreground information can be blended with background information in a hierarchical fashion to create a seamless and natural looking synthesized view. The blur introduced around the edges of an image feature in HHF, for example, can be due to the fact that both background and foreground pixels are generally given the same weight in the HHF calculations. In some embodiments, therefore, this blur can be reduced by assigning higher weights to depth values belonging to the background pixels than to foreground pixels. To this end, the following mapping function can be used:

$$w[i,j] = \frac{\gamma}{\sigma}\left(1 - \exp\left(-\left|\frac{\beta_{max} + \delta}{D[i,j]}\right|\right)\right).$$

In the mapping function, $w[i,j]$ is the assigned weight at pixel location $[i,j]$ and $D[i,j]$ is the disparity that can be expressed in terms of focal length F, camera base line B and depth Z as follows:

$$D[i,j] = \frac{F_r b}{Z[i,j]}.$$

The constants $\gamma$, $\sigma$, and $\delta$ can be derived as follows:

$\gamma = 3/2(\beta_{center}) + \beta_{min}$ $\sigma = 4/3(\beta_{center}) + \beta_{min}$ $\delta = 1/2(\beta_{center}) + \beta_{min}.$ The values $\beta_{min}$, $\beta_{max}$, and $\beta_{center}$ are respectively the minimum disparity, maximum disparity and the central disparity, where the central disparity is the average of the minimum and maximum disparities.

Figure 11:
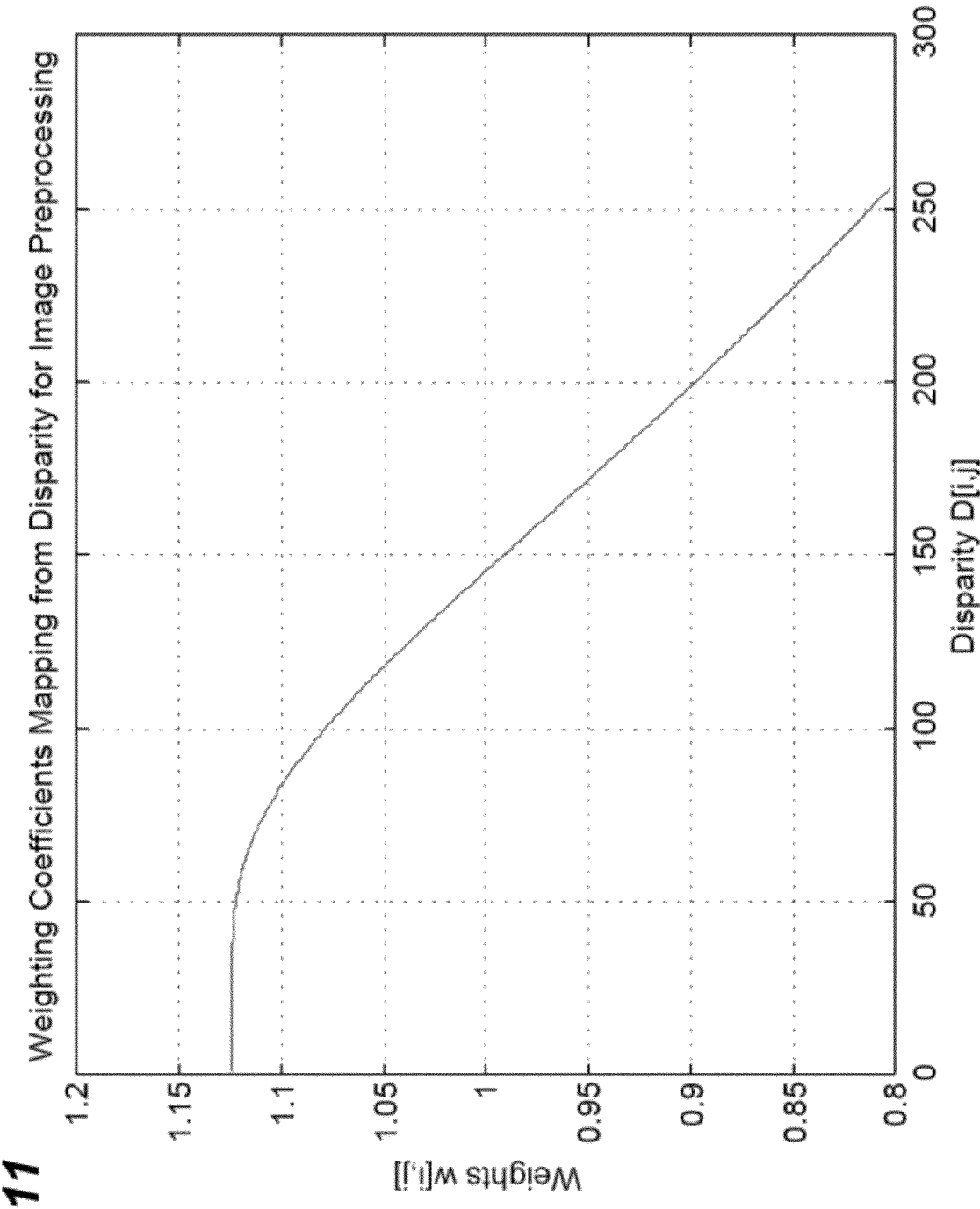
FIG. 11 depicts a plot of weighting coefficients as a function of disparity range, in accordance with some embodiments of the present invention.

FIG. 11 depicts a plot of weighting coefficients as a function of a full disparity range [0, 255]. In practice, this range depends on the image itself as the minimum and maximum disparity may vary. The mapping is not random, however, and the coefficients in the equations have been chosen to meet the following constraints:

1) Pixels with low disparity values can be considered background information and can be given higher weights. The weights assigned can be slightly larger than one to enhance the background. This weight can be determined by $\gamma/\sigma$, which provides a small enhancement to avoid over illumination distortions.

2) Pixels with high disparity values can be considered foreground and are given lower weights. The weights cannot be too small, however, as this can cause distortions around holes that are caused by depth map noise.

3) The transition between low and high disparity is preferably smooth, but can take other forms to accommodate various types of images, errors, or other factors.

Of course, other weighting coefficients could be derived to meet a different set of constraints and are contemplated herein. Once the weighting coefficients for depth preprocessing have been derived, the resulting depth preprocessed color image $I_{prep}$ can be expressed in terms of the wrapped image $I_{wrap}$ as follows:

$I_{prep}[i,j] = w[i,j] I_{wrap}[i,j].$

With regard to filling holes in an image, depth adaptive HHF utilizes similar steps to original HHF; however, the starting image can be the preprocessed image $I_{prep}$, and the last Fill operation can be applied to $I_{wrap}$.

In some embodiments, starting with the preprocessed image $I_{prep}$, a sequence of low-passed filtered image sequences $R_0, R_1 \ldots R_N$ can be produced using a combined Gaussian and zero elimination filtering operation (the Reduce operation). The number of lower-resolution images needed is image dependent, and the Reduce operation can be repeated until there are no longer holes in the most recent image. The Reduce operation can also be repeated until the number of holes in the most recent image is reduced to a certain number (the number can be pre-programmed or user selected), or until the size of holes in the most recent image is reduced to a certain size (the size can be pre-programmed or user selected).

In some embodiments, the lowest resolution image, $R_N$, can be expanded in an Expand operation. The Expand operation can produce an interpolated image $E_{N-1}$ of a size equal to that of $R_{N-1}$. In some embodiments, the Expand operation is essentially the reverse of the Reduce operation. During the expand operation, the holes in the $R_{N-1}$ image can be filled by a Fill operation that replaces the holes with the corresponding pixel(s) in $E_{N-1}$. The resulting image can be designated $F_{N-1}$. The Expand and Fill operations can be repeated with $F_{N-1}$, $F_{N-2}$, etc, until all, or substantially all, holes in the $F_0$ image are filled. The number of acceptable holes in the $F_0$ image can be determined by the user and can vary based on the desired final resolution and the quality of the original image, among other things.

Next, in some embodiments, the Fill operation can be applied to fill the holes in $I_{wrap}$ by replacing the holes with the corresponding pixel in $F_0$. The result can be an image with reduced blurring compared to some HHF images.

In some embodiments, HHF and depth adaptive HHF can reduce the amount of bandwidth and processing time needed for a TV, for example, to generate 3D images that contain either no holes or a substantially reduced number of holes. Through HHF and depth adaptive HHF, a TV can therefore efficiently produce 3D images from 2D images and corresponding depth maps.

Examples of various embodiments of the present invention are explained below. Experimental simulations were run on a data set of stereo images and ground truth depth maps. Tests were also run on "Ballet" and "Breakdance" 3D video sequences. Images obtained by HHF and depth adaptive HHF were then compared to images obtained by Zhang's method, Criminisi's method, and Vazquez's method (all briefly explained above).

Example 1

HHF vs. Depth Map Smoothing

Figure 12B:
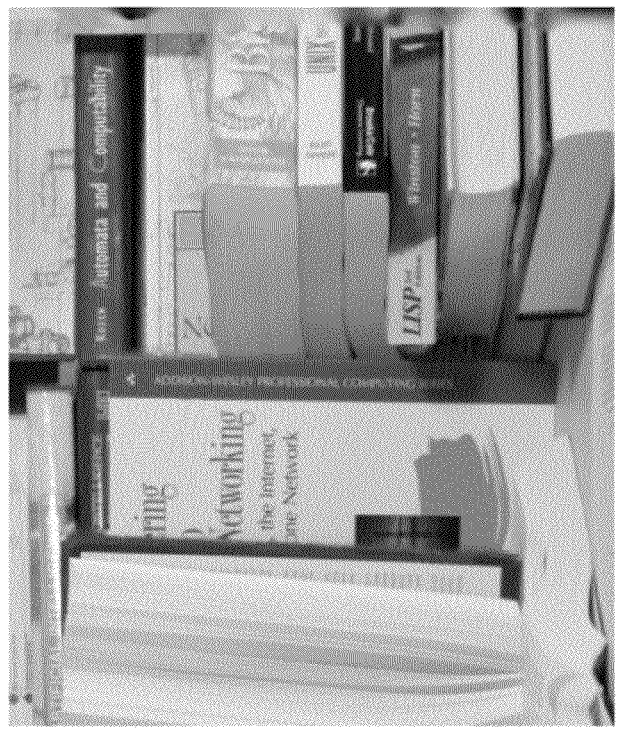
FIG. 12b depicts a 3D wrapped image after applying HHF, in accordance with some embodiments of the present invention.
Figure 12A:
FIG. 12a depicts a 3D wrapped image after applying Zhang's filtering approach for hole-filling.
Figure 12D:
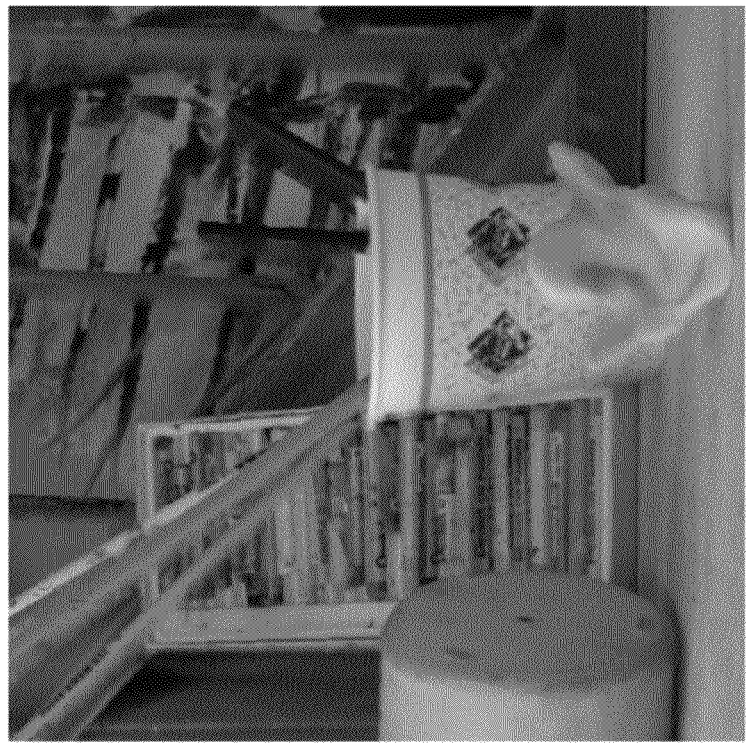
FIG. 12d depicts a 3D wrapped image after applying HHF, in accordance with some embodiments of the present invention.
Figure 12C:
FIG. 12c depicts a 3D wrapped image after applying Zhang's filtering approach for hole-filling.
Figure 12F:
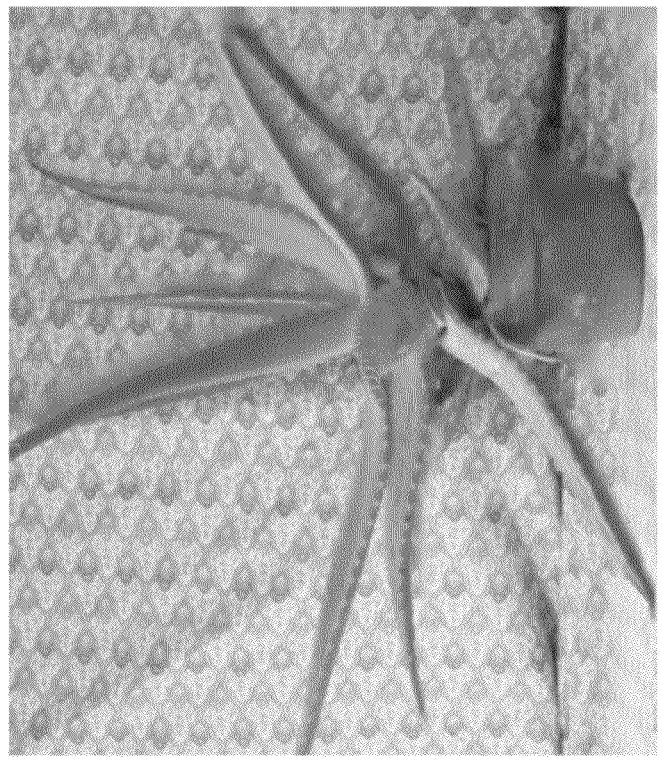
FIG. 12f depicts a 3D wrapped image after applying HHF, in accordance with some embodiments of the present invention.
Figure 12E:
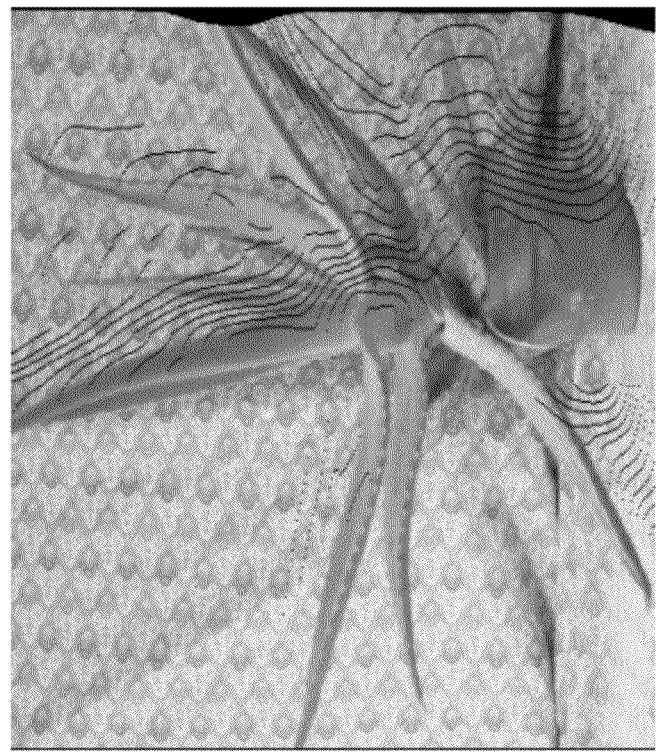
FIG. 12e depicts a 3D wrapped image after applying Zhang's filtering approach for hole-filling.

FIG. 12 shows the comparison between Zhang's approach (FIG. 12a) and DIBR using HHF (FIG. 12b). The virtual image yielded by HHF in FIG. 12b has substantially no geometric distortions. To the contrary, with regard to FIG. 12a, the virtual image produced by Zhang's filtering approach has obvious geometric distortions and average filtering is needed to eliminate additional holes. Similarly, as shown in FIGS. 12d and 12f, HHF substantially eliminates disocclusion without substantial geometric distortion. Conversely, Zhang's filtering approach yields images with very noticeable geometric distortions and some disocclusion, as shown in FIGS. 12c and 12e.

Figure 13B:
FIG. 13b depicts a stereo matching algorithm depth map of an image.
Figure 13A:
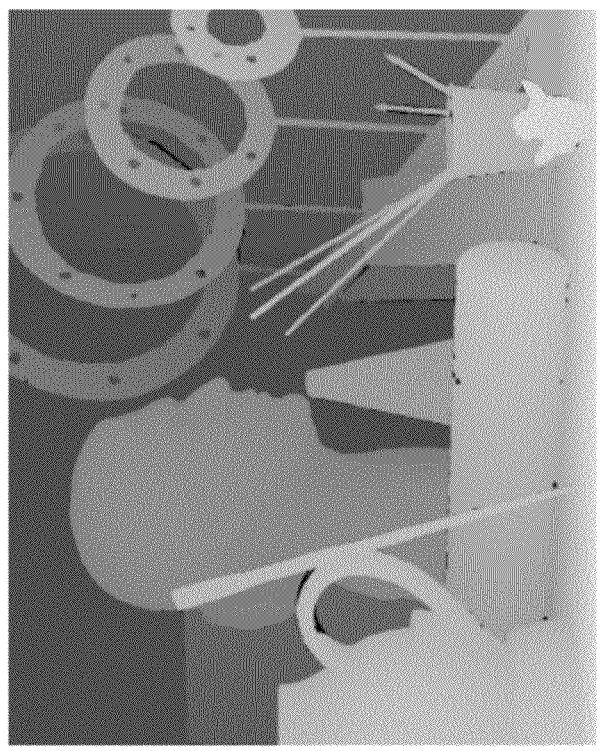
FIG. 13a depicts a ground truth disparity depth map of an image.

Another advantage of HHF over depth map filtering is that HHF is less sensitive to poor depth map estimation. The results shown in FIGS. 12a-12f were all based on ground truth high accuracy depth maps. However, in practice, depth maps are often generated using a stereo matching algorithm. The estimate of the depth map from a stereo matching algorithm usually suffers from percentage of bad matching pixels. Bad matching pixels can be, for example, incorrect or undetermined depth values that exist in a depth map that was generated from a stereos matching algorithm. As an example, FIG. 13 shows the ground truth disparity map (FIG. 13a) and the depth map obtained through a stereo matching algorithm (FIG. 13b). The bad matching pixels in FIG. 13b appear as holes and/or distortions.

Figure 13C:
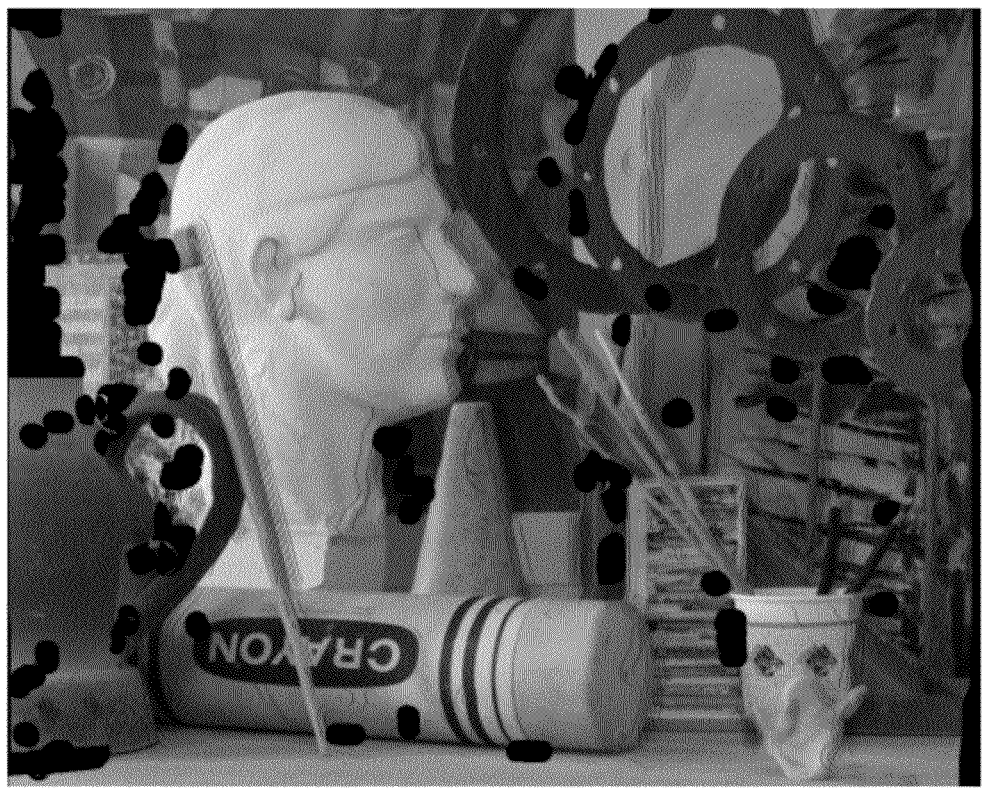
FIG. 13c depicts a 3D wrapped image after applying Zhang's filtering approach for hole-filling.
Figure 13D:
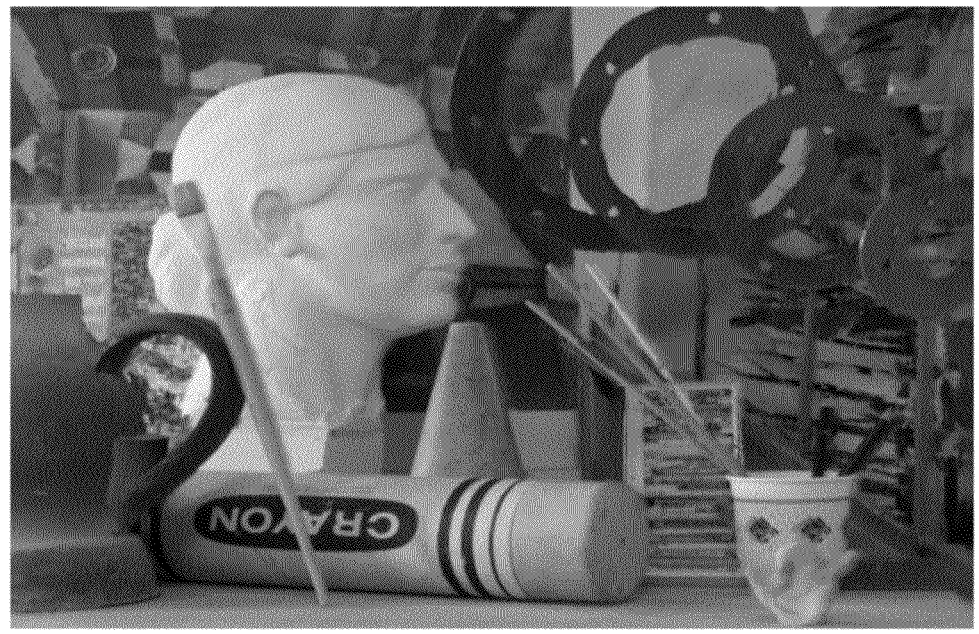
FIG. 13d depicts a 3D wrapped image after applying HHF, in accordance with some embodiments of the present invention.
Figure 14A:
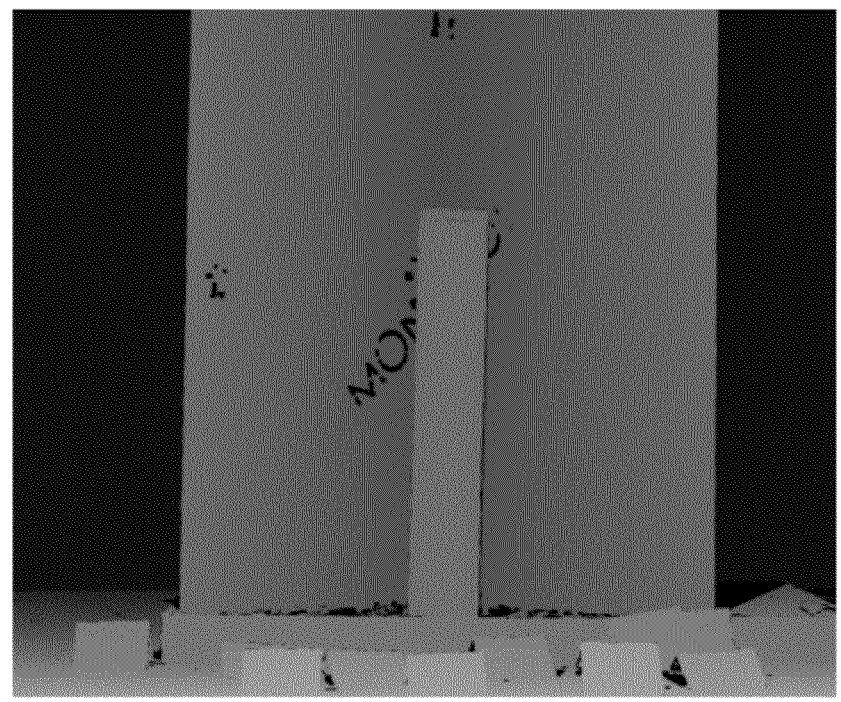
FIG. 14a depicts a ground truth disparity depth map of an image.
Figure 14B:
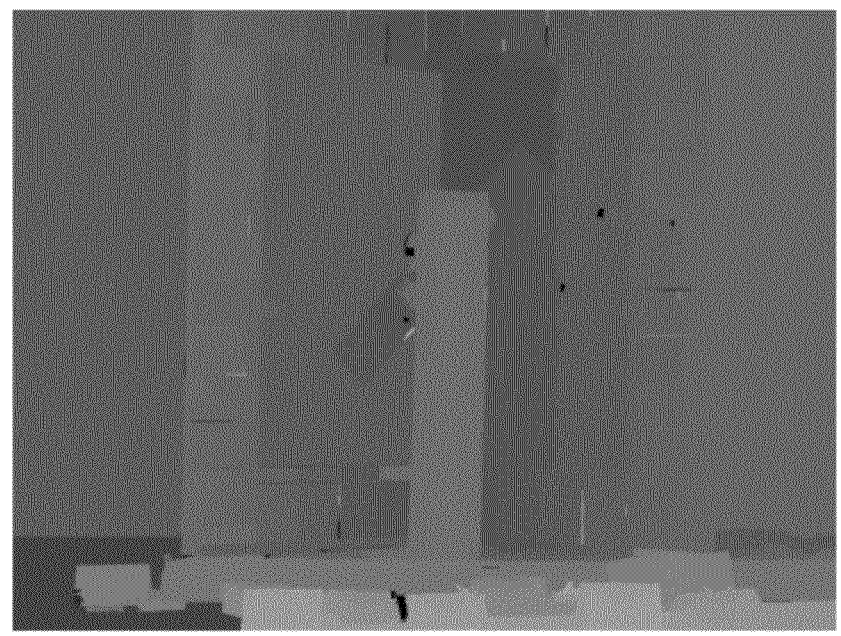
FIG. 14b depicts a stereo matching algorithm depth map of an image.
Figure 14C:
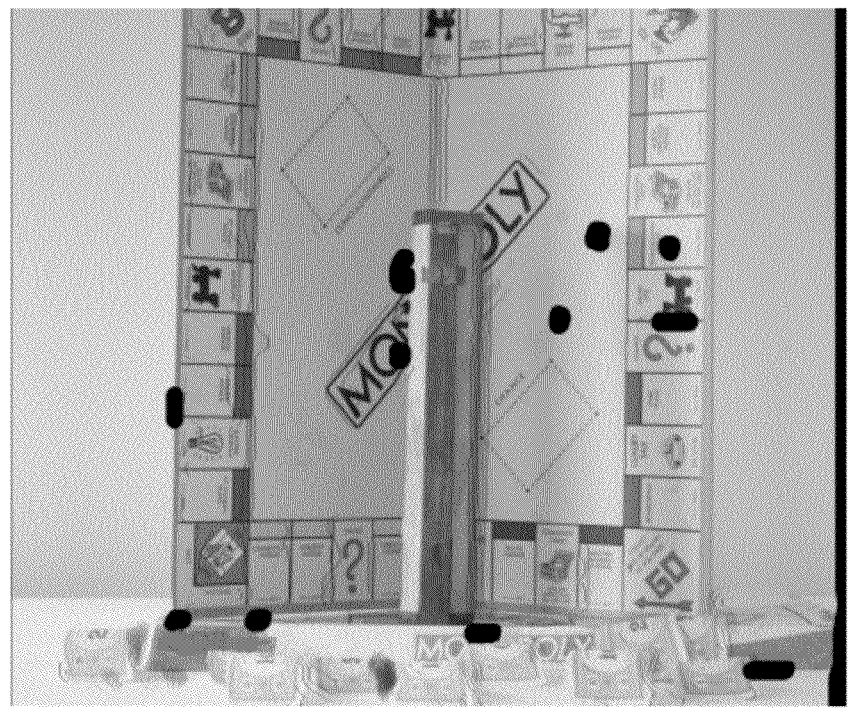
FIG. 14c depicts a 3D wrapped image after applying Zhang's filtering approach for hole-filing.
Figure 14D:
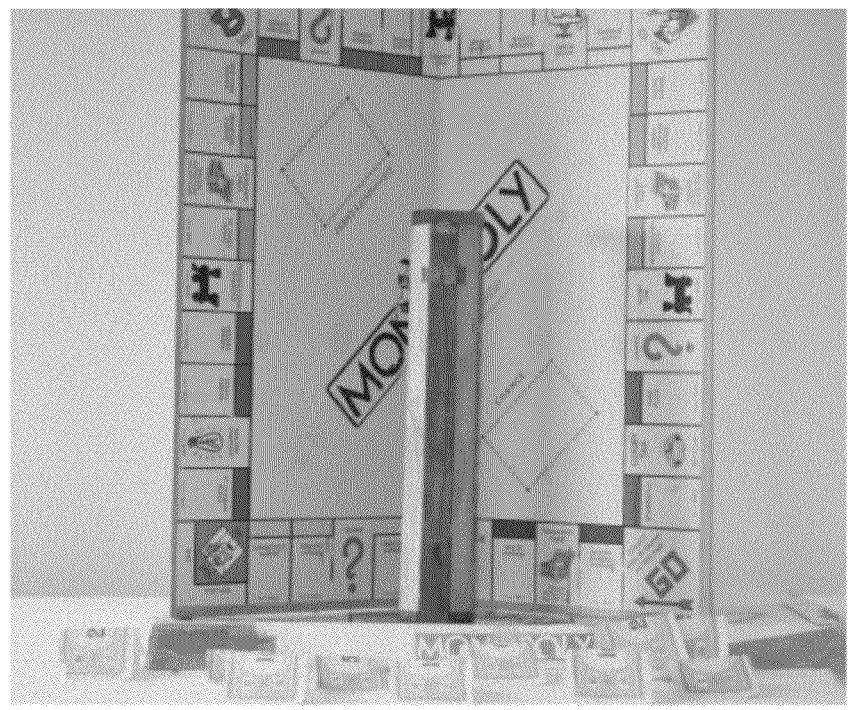
FIG. 14d depicts a 3D wrapped image after applying HHF, in accordance with some embodiments of the present invention.

In FIG. 13c and FIG. 13d, the depth map generated by stereo matching (FIG. 13b) was used to estimate virtual views. The image in FIG. 13c was generated using DIBR with Zhang's depth map filtering while the image in FIG. 13d was generated using DIBR with HHF. These figures show that the filtering approach causes visible distortions (e.g., the black lines and other distortions in FIG. 13c). On the other hand, HHF generates a substantially disocclusion-free intermediate view.

FIG. 14 illustrates another example of the advantages of HHF. FIG. 14a shows a high accuracy ground truth depth map while FIG. 14b shows a depth map obtained by applying stereo matching. FIG. 14c and FIG. 14d are the rendered images obtained using the depth map in FIG. 14b by applying Zhang's filtering and HHF approaches, respectively. Holes and distortions are obvious using Zhang's approach (FIG. 14c), while the HHF image (FIG. 14d) is substantially hole and distortion free. The results show that, unlike Zhang's filtering approach, HHF is substantially insensitive to percentages of bad matching pixels in depth maps.

Example 2

HHF and Depth Adaptive HHF vs. Depth Map Smoothing and Inpainting

FIG. 15 and FIG. 16 each show four synthesized views after applying depth adaptive HHF, Zhang's depth map symmetric filtering, and inpainting through Vazquez's horizontal interpolation, respectively.

Figure 15B:
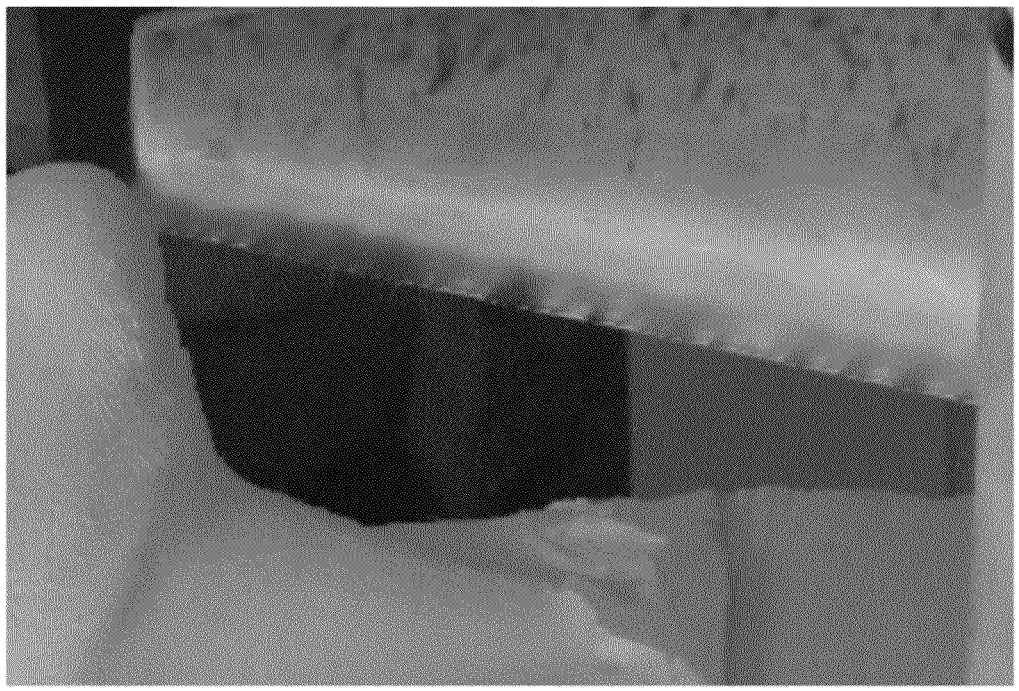
FIG. 15b depicts a 3D wrapped image after applying HHF, in accordance with some embodiments of the present invention.
Figure 15A:
FIG. 15a depicts a 3D wrapped image after applying depth adaptive HHF, in accordance with some embodiments of the present invention.
Figure 16A:
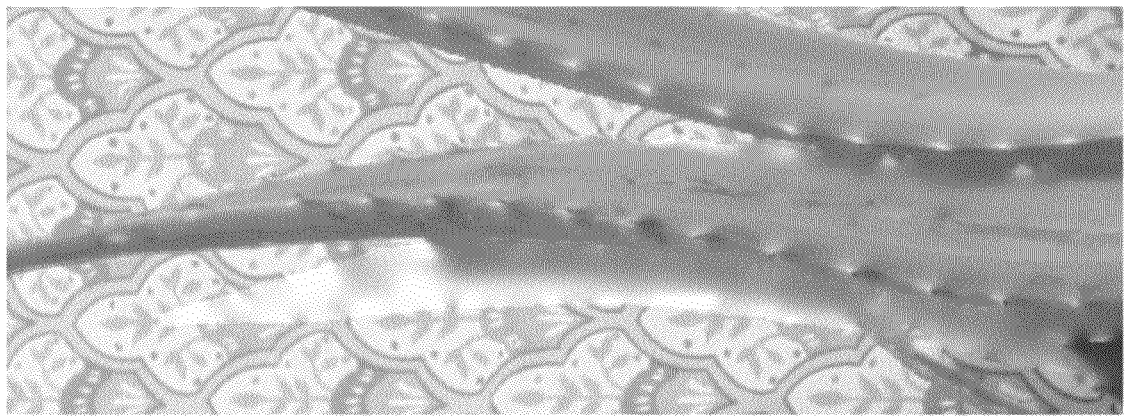
FIG. 16a depicts a 3D wrapped image after applying depth adaptive HHF, in accordance with some embodiments of the present invention.
Figure 16B:
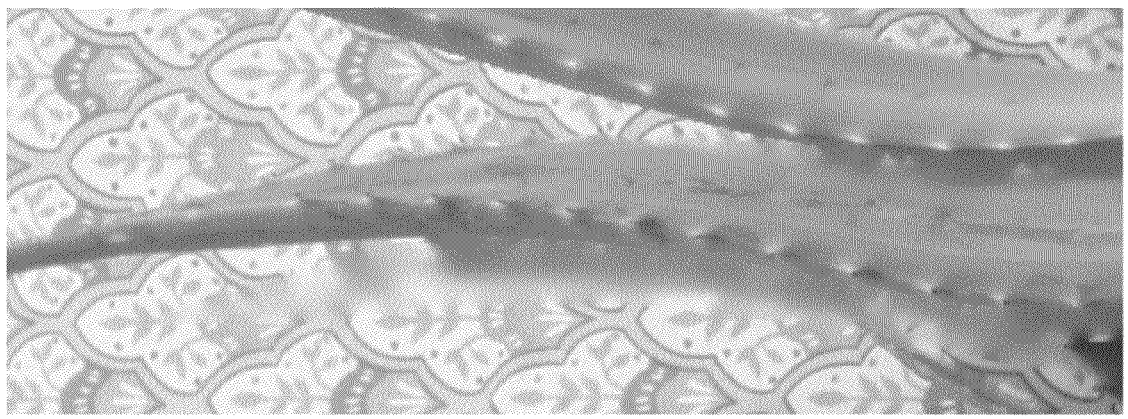
FIG. 16b depicts a 3D wrapped image after applying HHF, in accordance with some embodiments of the present invention.

FIGS. 15a and 16a show views synthesized by depth adaptive HHF, and FIGS. 15b and 16b show views synthesized by HHF. These images are of generally high quality, have sharp edges, and do not show substantial distortions. In FIG. 16, depth adaptive HHF (FIG. 16a) shows a clearer texture reconstruction than HHF (FIG. 16b).

Figure 15D:
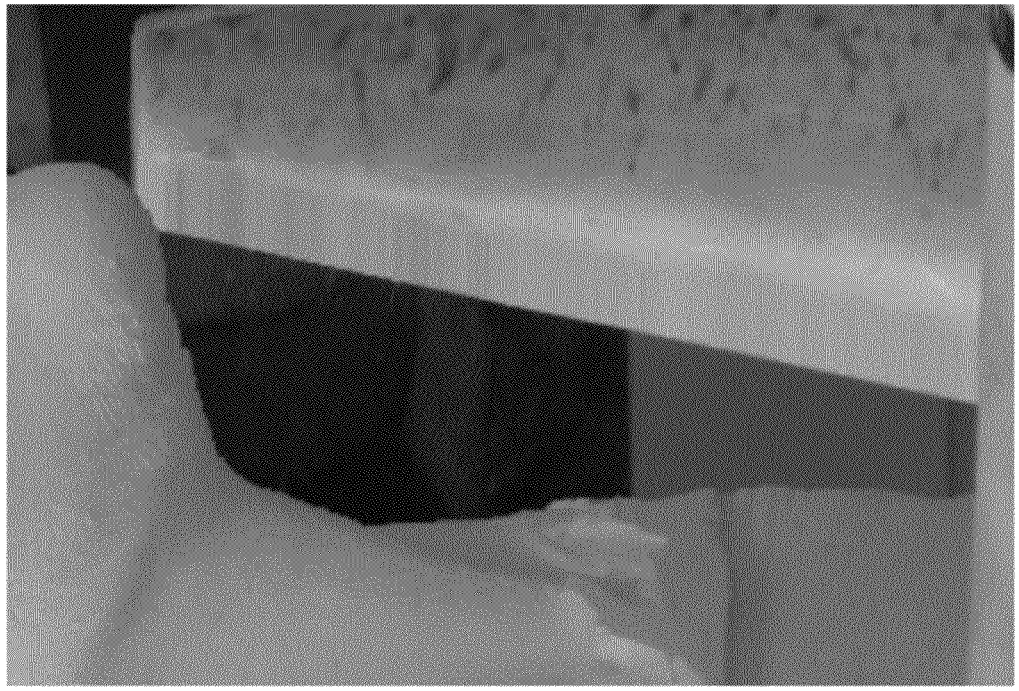
FIG. 15d depicts a 3D wrapped image after applying Vazquez's horizontal interpolation approach for hole-filing.
Figure 15C:
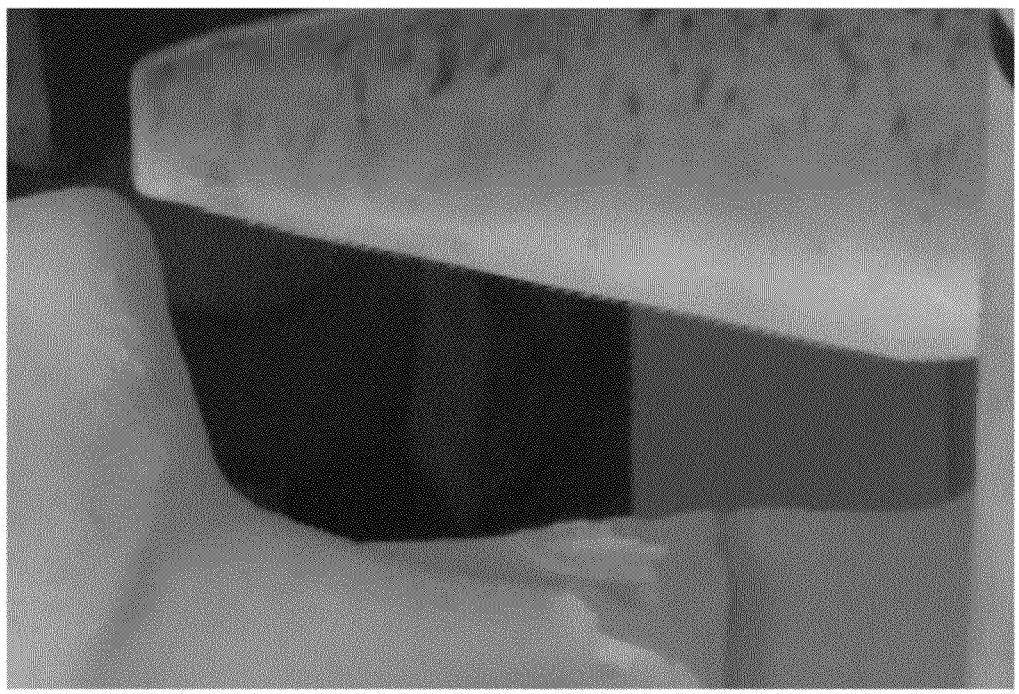
FIG. 15c depicts a 3D wrapped image after applying Zhang's filtering approach for hole-filing.
Figure 16C:
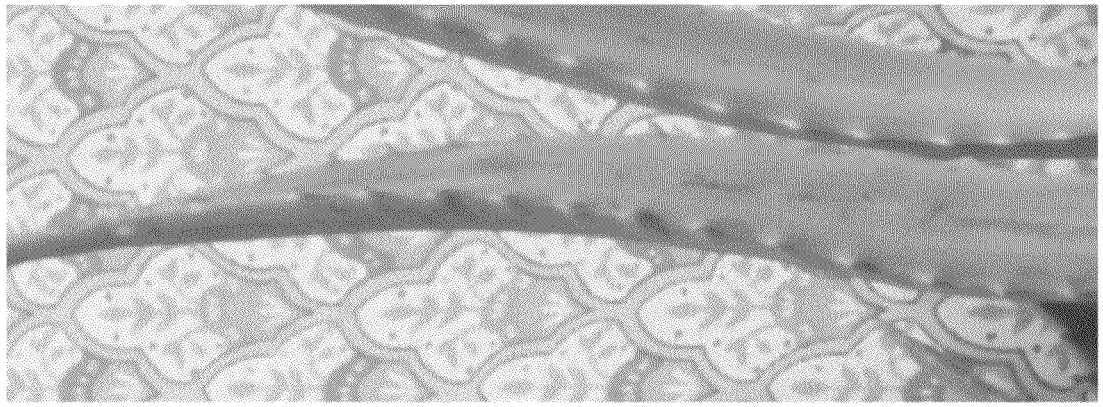
FIG. 16c depicts a 3D wrapped image after applying Zhang's filtering approach for hole-filing.

FIGS. 15c and 16c show that, while Zhang's depth map smoothing appears to result in a clean image near the edges of objects, it causes severe geometric distortions. These distortions can be seen, for example, in the bottom-left of the pyramid in FIG. 15c and in the bowing of the leaf in FIG. 16c (the leaf in FIG. 16c is flatter than it is in the other images, indicating that it is geometrically distorted).

Figure 16D:
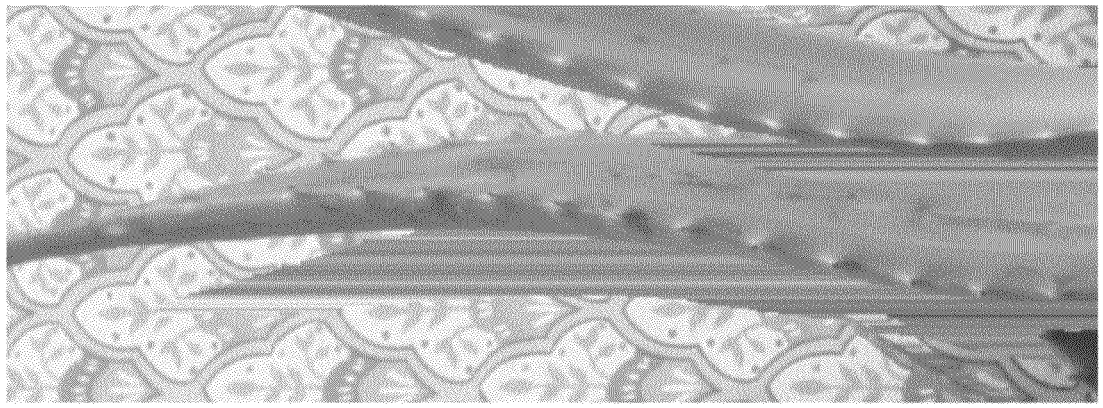
FIG. 16d depicts a 3D wrapped image after applying Vazquez's horizontal interpolation approach for hole-filing.

FIGS. 15d and 16d show that inpainting through Vazquez's horizontal interpolation causes severe distortions on the texture of the background.

Example 3

PSNR Analysis of Stereoscopic Images

In another test, two views of several images were synthesized from a first view of each image. The holes in the synthesized views were then filled by applying depth adaptive HHF, HHF, Zhang's depth map filtering, and Vazquez's inpainting through horizontal interpolation. The resulting views were evaluated by peak signal-to-noise ratio ("PSNR"), which is a measure of the quality of the reconstructed image, with higher output dB values denoting higher reconstruction quality. The resulting dB outputs are shown below:

|  | Depth Adaptive HHF | HHF | Zhang's Depth Map Smoothing | Vazquez's Horizontal Interpolation |
| --- | --- | --- | --- | --- |
| Aloe2 | 20.8734 | 20.8648 | 18.9927 | 19.1042 |
| Aloe0 | 21.0221 | 20.9036 | 18.8986 | 20.8023 |
| Art2 | 18.8811 | 18.8732 | 18.0058 | 18.8721 |
| Art0 | 18.2123 | 18.2077 | 17.7787 | 17.6509 |
| Books2 | 17.4163 | 17.3272 | 15.4874 | 15.2277 |
| Books0 | 17.7367 | 17.701 | 17.2362 | 17.373 |
| Monopoly2 | 21.0825 | 20.9825 | 17.223 | 20.1216 |
| Monoploy0 | 20.8635 | 20.9815 | 16.8117 | 19.7395 |

From the results it is clear that depth adaptive HHF has a significant advantage, up to approximately 2 dB, over horizontal interpolation and depth map smoothing. The results also show that depth adaptive HHF slightly outperforms original HHF by approximately 0.1 to 0.3 dB.

Example 4

Performance Analysis of Stereoscopic Videos

Figure 17A:
FIG. 17a depicts a 3D wrapped image with no hole-filling applied.
Figure 17B:
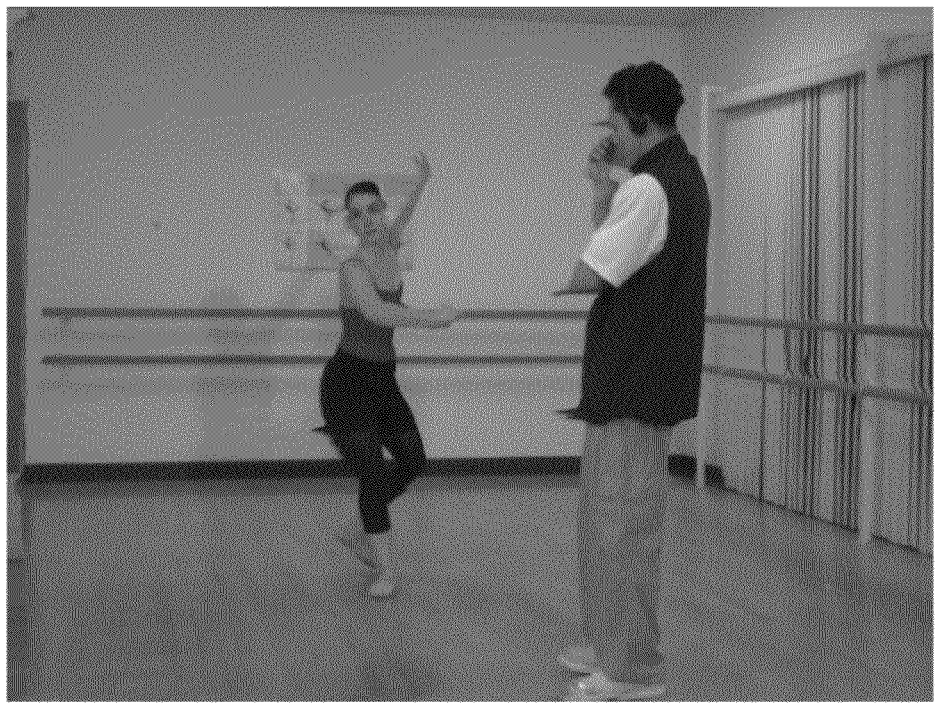
FIG. 17b depicts a 3D wrapped image after applying Zhang's filtering approach for hole-filing.
Figure 17C:
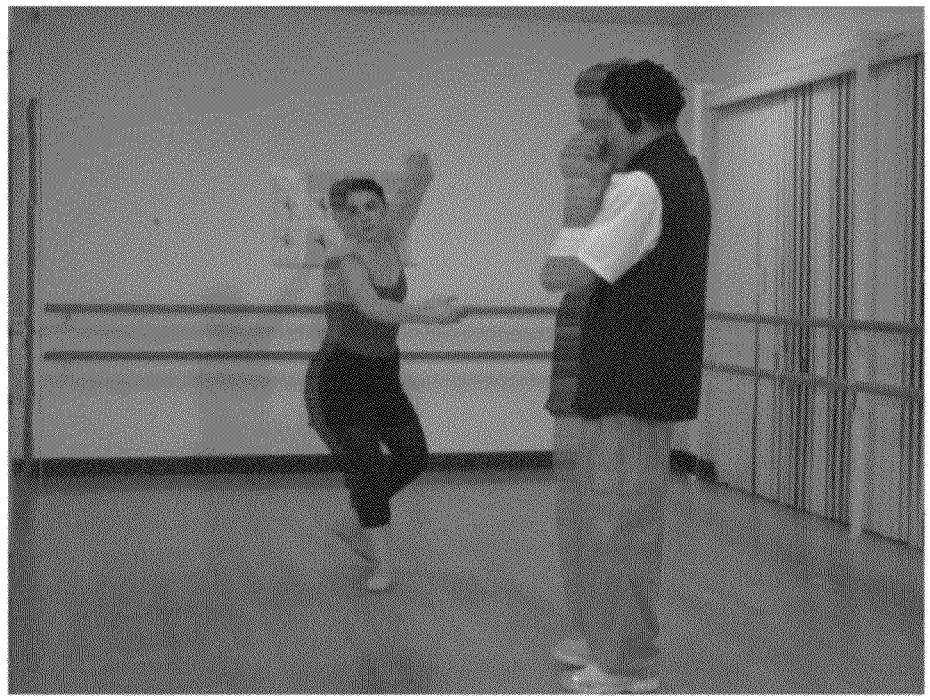
FIG. 17c depicts a 3D wrapped image after applying Vazquez's horizontal interpolation approach for hole-filing.
Figure 17D:
FIG. 17d depicts a 3D wrapped image after applying Criminisi's inpainting approach for hole-filing.

FIGS. 17a-17f show a 3D wrapped image from a "Ballet" sequence after applying five different hole-filing algorithms. FIG. 17a shows the image after 3D wrapping but before any hole-filling. FIG. 17b shows the frame when the holes are filled using Zhang's depth map filtering approach. The resulting image suffers from visible geometric distortions which would be a source of visual discomfort. FIG. 17c shows the frame when the holes are filled using Vazquez's inpainting through horizontal interpolation approach. This method yields an image with very obvious distortions which are temporally and spatially visible through significant intensity changes and severe flickering, which tends to be annoying to viewers. Hole-filling using Criminisi's image inpainting approach is shown in FIG. 17d, and the resulting frame suffers from significant distortions. Moreover, Criminisi's method also results in severe temporal flickering.

In addition to the poor quality, another disadvantage of using image inpainting techniques is the processing speed. With inpainting techniques, for example, it takes an average of 30 minutes to process a single frame with a resolution of 1024×768 using MATLAB on a PC with 3.0 GHz Intel Core2 Quad CPU and 3.25 GB of RAM. In comparison, it takes an average of only 2.3 seconds for Zhang's approach, 1.92 seconds for Vazquez's approach, 4.89 seconds for HHF, and 5.52 seconds for depth adaptive HHF.

Embodiments of the present invention, therefore, can produce high-quality 2D and 3D images from 2D images with a variety of inherent or induced errors (e.g., transmission or processing errors) with improved computational efficiency. This efficiency can enable the system to be used in a variety of devices with displays including, but not limited to, 3DTVs, mobile phones, iPods®, computers, and tablets. The system can be implemented as a software or hardware platform.

In addition, the system can be deployed, for example, by the provider or at the client end. In some embodiments, for example, a cable or streaming provider or a broadcaster can use the system to broadcast (or stream) high quality 2D or 3D images. In some embodiments, the system can be used to provide, for example, a media server with high quality 2D or 3D media. The system can also be deployed by the end user (e.g., at the consumer level) in, for example and not limitation, enabled TVs, laptops, and tablets, or by stand alone or add-on receivers or players (e.g., cable or satellite boxes or DVRs). Thus, embodiments of the present invention have broad application across providers, end user, and content providers and can implement a wide variety of hardware and software platforms.

Figure 17E:
FIG. 17e depicts a 3D wrapped image after applying HHF, in accordance with some embodiments of the present invention.
Figure 17F:
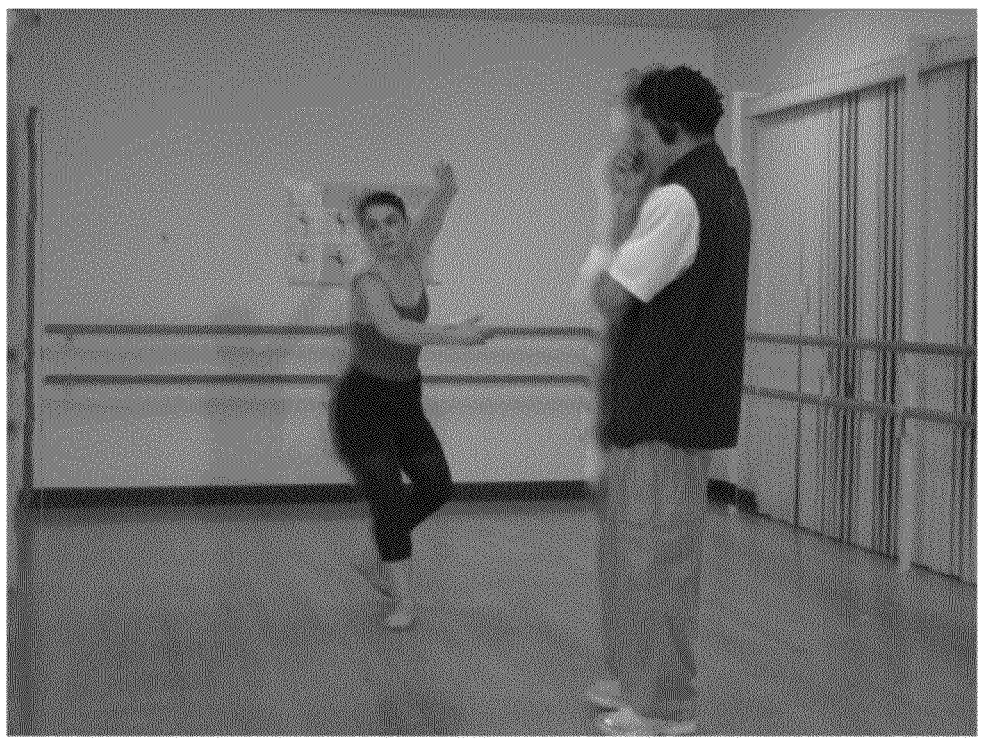
FIG. 17f depicts a 3D wrapped image after applying depth adaptive HHF, in accordance with some embodiments of the present invention.

The images of FIG. 17e and FIG. 17f show hole-filling using HHF and depth adaptive HHF, respectively. In both examples, disocclusion is substantially eliminated without substantial geometric distortion, whereas the other approaches have very noticeable geometric distortions and some disocclusion. While HHF removes disocclusion, blur is introduced around the previously disoccluded areas, as can be seen in FIG. 17e. The blurs are reduced in FIG. 17f because depth adaptive HHF is applied.

Testing has shown that blurs resulting from HHF are often not visible because blurred areas will be overshadowed by high-resolution surroundings. The tests also show that there is temporal consistency in both HHF and depth adaptive HHF, and therefore there is substantially no flickering in the resulting videos. The geometric distortions introduced by the filtering and inpainting approaches, on the other hand, are visible in the form of significant intensity changes and in the form of severe flickering.

Figure 18A:
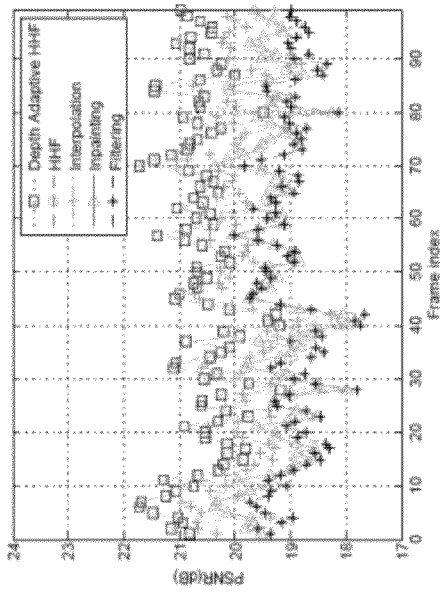
FIGS. 18a-18b depict peak signal-to-noise ratio (PSNR) comparison results for several methods of hole-filling, including HHF and depth adaptive HHF, in accordance with some embodiments of the present invention.
Figure 18B:
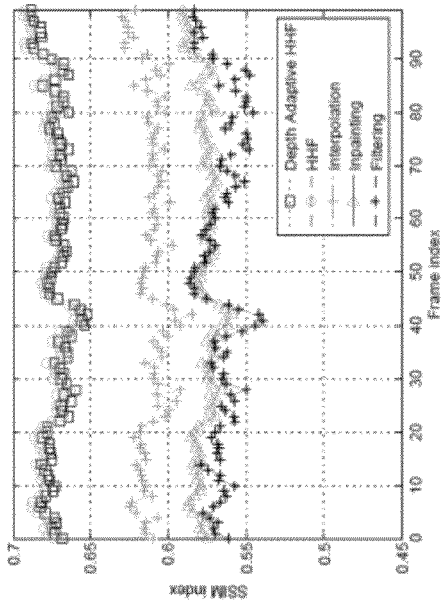
Figure 18C:
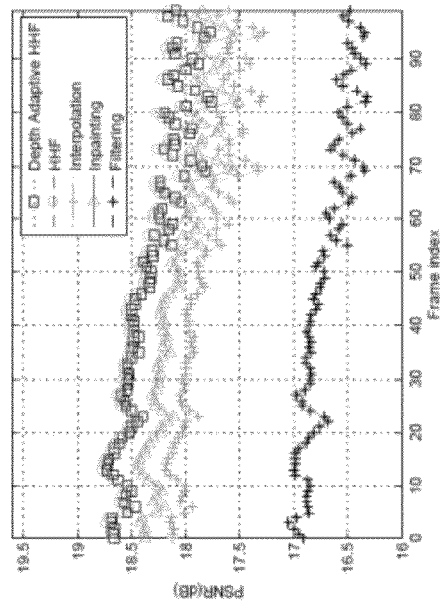
FIGS. 18c-18d depict structural similarity (SSIM) comparison results for several methods of hole-filling, including HHF and depth adaptive HHF, in accordance with some embodiments of the present invention.
Figure 18D:
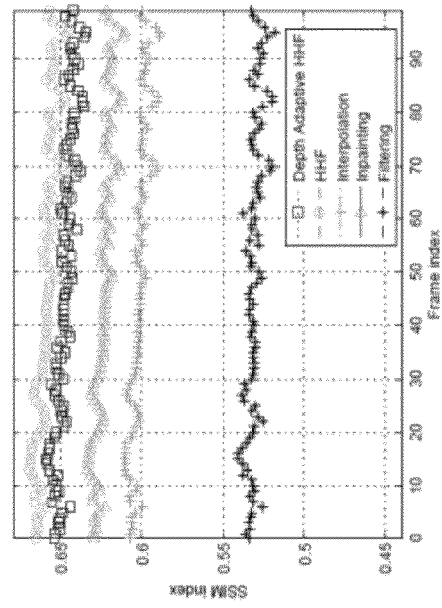

FIG. 18a and FIG. 18b show the PSNR (peak signal-to-noise ratio) comparison results for "Ballet" and "Breakdance" sequences, respectively. The dB curves of the HHF method and depth adaptive HHF method are always superior to those of other methods (filtering and inpainting), with a gain of 0.9 to 2.0 dB. Similarly FIG. 18c and FIG. 18d show the structural similarity (SSIM) comparison for the "Ballet" and "Breakdance" sequences, respectively. The results show a significant gain in the SSIM index of the frames utilizing HHF and/or depth adaptive HHF, as compared to filtering and inpainting.

While several possible embodiments are disclosed above and throughout this specification, embodiments of the present invention are not so limited. For instance, while several possible methods for HHF and depth adaptive HHF have been provided, other suitable methods, configurations, or combinations could be selected without departing from the spirit of embodiments of the invention. In addition, the configuration used for various features of embodiments of the present invention can be varied according to a particular type of display and/or multimedia scenario. Such changes are intended to be embraced within the scope of the invention.

The specific methods, method steps, systems, and other embodiments disclosed can be varied according to particular needs. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

We claim:

1. A method for filling holes in a 3D wrapped image comprising:
    reducing the resolution of the 3D wrapped image until the number of holes, the size of the holes, or both contained in a reduced-resolution 3D wrapped image are below a predetermined threshold, wherein the predetermined threshold is met when the total size of the holes in the reduced-resolution image is between 0% and 5% of the total image size;
    expanding the reduced-resolution 3D wrapped image to produce an expanded 3D wrapped image; and
    using data from the expanded 3D wrapped image to fill holes in the 3D wrapped image.

2. The method of claim 1, wherein Gaussian filtering is used to reduce the resolution of the 3D wrapped image.

3. The method of claim 2, wherein pseudo hole canceling is used to reduce the resolution of the 3D wrapped image.

4. The method of claim 1, wherein reducing the resolution of the 3D wrapped image comprises reducing the resolution of a first discrete section of the 3D wrapped image and thereafter filtering a second discrete section of the 3D wrapped image.

5. The method of claim 4, wherein the first and second discrete sections comprise a [5×5] pixel window.

6. The method of claim 1, wherein the predetermined threshold is met when there are zero holes remaining.

7. The method of claim 1, wherein the predetermined threshold is met when all holes are smaller than 5×5 pixels.

8. A method for filling holes, correcting errors, and reducing blur in a 3D wrapped image comprising:
    processing the 3D wrapped image using a wrapped depth map to produce a depth processed 3D wrapped image;
    reducing the resolution of the depth processed 3D wrapped image until the number of holes, the size of the holes, or both contained in a reduced-resolution, depth processed 3D wrapped image are below a predetermined threshold, wherein the predetermined threshold is met when the total size of the holes in the reduced-resolution image is between 0% and 5% of the total image size;
    expanding the reduced-resolution, depth processed 3D wrapped image to produce an expanded, depth processed 3D wrapped image; and
    using data from the expanded, depth processed 3D wrapped image to fill holes in the 3D wrapped image.

9. The method of claim 8, wherein a first pixel in the depth processed 3D image with a lower disparity value is given higher weight than a second pixel with a higher disparity value in the expanded, depth processed 3D wrapped image to reduce blur.

10. The method of claim 9, wherein the ration of first pixel weight to the second pixel weight is between 1 and 1.25 to reduce over illumination distortion.

* * * * *